(12) United States Patent
Struik

(10) Patent No.: US 8,467,535 B2
(45) Date of Patent: *Jun. 18, 2013

(54) ACCELERATED VERIFICATION OF DIGITAL SIGNATURES AND PUBLIC KEYS

(75) Inventor: Marinus Struik, Toronto (CA)

(73) Assignee: Certicom Corp., Mississauga, ON (CA)

( * ) Notice: Subject to any disclaimer, the term of this patent is extended or adjusted under 35 U.S.C. 154(b) by 11 days.

This patent is subject to a terminal disclaimer.

(21) Appl. No.: 13/041,759

(22) Filed: Mar. 7, 2011

(65) Prior Publication Data

US 2011/0194694 A1  Aug. 11, 2011

Related U.S. Application Data

(63) Continuation-in-part of application No. 11/333,296, filed on Jan. 18, 2006, now Pat. No. 8,204,232.

(60) Provisional application No. 60/644,034, filed on Jan. 18, 2005.

(51) Int. Cl.
*H04L 9/08* (2006.01)

(52) U.S. Cl.
USPC ............... 380/282; 380/277; 380/30; 380/28; 713/171; 713/172; 713/173; 713/168

(58) Field of Classification Search
None
See application file for complete search history.

(56) References Cited

U.S. PATENT DOCUMENTS

| | | | |
|---|---|---|---|
| 4,519,036 A | 5/1985 | Green | |
| 4,745,568 A | 5/1988 | Onyszchuk et al. | |
| 4,748,668 A | 5/1988 | Shamir et al. | |
| 4,890,323 A | 12/1989 | Becker et al. | |
| 4,989,171 A | 1/1991 | Hollmann | |
| 5,146,500 A | 9/1992 | Maurer | |
| 5,150,411 A | 9/1992 | Maurer | |
| 5,159,632 A | 10/1992 | Crandall | |

(Continued)

FOREIGN PATENT DOCUMENTS

| | | |
|---|---|---|
| EP | 0588339 | 3/1994 |
| FR | 2536928 | 6/1984 |

(Continued)

OTHER PUBLICATIONS

Examiner's Report issued in Canadian Application No. 2,259,089 on Feb. 2, 2009; 3 pages.

(Continued)

*Primary Examiner* — Pramila Parthasarathy
(74) *Attorney, Agent, or Firm* — Fish & Richardson P.C.

(57) ABSTRACT

Accelerated computation of combinations of group operations in a finite field is provided by arranging for at least one of the operands to have a relatively small bit length. For example, a technique for verifying a signature of a message can include applying a first mathematical function to a combination of the first signature component and the second message portion to obtain an intermediate component, using the intermediate component to generate a first value and a second value, where a second mathematical function applied to the first value and the second value obtains the intermediate component, and determining the ephemeral public key based on the first value, the second value, the second signature component, the base point of the elliptic curve, and a long-term public key of the long-term private-public key pair. The technique can include verifying whether a representation of the first message portion satisfies a predetermined characteristic.

30 Claims, 19 Drawing Sheets

U.S. PATENT DOCUMENTS

| | | | |
|---|---|---|---|
| 5,202,995 A | 4/1993 | O'Brien | |
| 5,218,637 A | 6/1993 | Angebaud et al. | |
| 5,271,061 A | 12/1993 | Crandall | |
| 5,272,755 A | 12/1993 | Miyaji et al. | |
| 5,351,297 A | 9/1994 | Miyaji et al. | |
| 5,373,560 A | 12/1994 | Schlafly | |
| 5,442,707 A | 8/1995 | Miyaji et al. | |
| 5,463,690 A | 10/1995 | Crandall | |
| 5,497,423 A | 3/1996 | Miyaji | |
| 5,511,198 A | 4/1996 | Hotta | |
| 5,524,222 A | 6/1996 | Hervin | |
| 5,627,893 A | 5/1997 | Demytko | |
| 5,650,948 A | 7/1997 | Gafter | |
| 5,675,645 A | 10/1997 | Schwartz et al. | |
| 5,757,918 A | 5/1998 | Hopkins | |
| 5,761,305 A | 6/1998 | Vanstone et al. | |
| 5,764,772 A | 6/1998 | Kaufman et al. | |
| 5,768,389 A | 6/1998 | Ishii | |
| 5,778,069 A | 7/1998 | Thomlinson et al. | |
| 5,825,880 A | 10/1998 | Sudia et al. | |
| 5,889,865 A | 3/1999 | Vanstone et al. | |
| 5,892,899 A | 4/1999 | Aucsmith et al. | |
| 5,896,455 A | 4/1999 | Vanstone et al. | |
| 5,937,066 A | 8/1999 | Gennaro et al. | |
| 5,987,131 A | 11/1999 | Clapp | |
| 5,999,626 A | 12/1999 | Mullin et al. | |
| 6,122,736 A | 9/2000 | Vanstone et al. | |
| 6,141,420 A | 10/2000 | Vanstone et al. | |
| 6,212,279 B1 | 4/2001 | Reiter et al. | |
| 6,243,467 B1 | 6/2001 | Reiter et al. | |
| 6,279,110 B1 | 8/2001 | Johnson et al. | |
| 6,298,135 B1 | 10/2001 | Messerges et al. | |
| 6,304,658 B1 | 10/2001 | Kocher et al. | |
| 6,334,189 B1 | 12/2001 | Granger et al. | |
| 6,411,715 B1 | 6/2002 | Liskov et al. | |
| 6,419,159 B1 | 7/2002 | Odinak | |
| 6,430,588 B1 | 8/2002 | Kobayashi et al. | |
| 6,446,207 B1 | 9/2002 | Vanstone et al. | |
| 6,496,929 B2 | 12/2002 | Lenstra | |
| 6,724,894 B1 | 4/2004 | Singer | |
| 6,816,594 B1 | 11/2004 | Okeya | |
| 6,829,356 B1 | 12/2004 | Ford | |
| 6,873,706 B1 | 3/2005 | Miyazaki et al. | |
| 7,110,538 B2 | 9/2006 | Gallant et al. | |
| 7,127,063 B2 | 10/2006 | Lambert et al. | |
| 7,215,780 B2 | 5/2007 | Lambert et al. | |
| 7,421,074 B2 | 9/2008 | Jin et al. | |
| 7,486,789 B2 | 2/2009 | Futa et al. | |
| 7,593,527 B2 * | 9/2009 | Beeson | 380/30 |
| 7,599,491 B2 | 10/2009 | Lambert | |
| 7,613,660 B2 | 11/2009 | Pintsov | |
| 2001/0053220 A1 | 12/2001 | Kocher et al. | |
| 2002/0044649 A1 | 4/2002 | Gallant et al. | |
| 2002/0057796 A1 | 5/2002 | Lambert et al. | |
| 2002/0166058 A1 | 11/2002 | Fueki | |
| 2003/0021410 A1 | 1/2003 | Miyazaki et al. | |
| 2003/0044003 A1 | 3/2003 | Chari et al. | |
| 2003/0048903 A1 | 3/2003 | Ito et al. | |
| 2003/0059042 A1 | 3/2003 | Okeya et al. | |
| 2003/0059043 A1 | 3/2003 | Okeya et al. | |
| 2003/0061498 A1 | 3/2003 | Drexler et al. | |
| 2005/0135606 A1* | 6/2005 | Brown | 380/28 |

FOREIGN PATENT DOCUMENTS

| | | |
|---|---|---|
| FR | 2672402 | 8/1992 |
| JP | 2002328602 | 11/2002 |
| JP | 2004163687 | 6/2004 |
| WO | 9116691 | 10/1991 |
| WO | 9800771 | 1/1998 |
| WO | 9852319 | 11/1998 |
| WO | 0042733 | 7/2000 |
| WO | 2006076800 | 7/2006 |
| WO | 2009030021 | 3/2009 |

OTHER PUBLICATIONS

Supplementary European Search Report issued in corresponding European Application No. 06701572.7 on Oct. 6, 2009; 4 pages.

Proceeding further with the European Application Pursuant to Rule 70(2) EPC issued in European Application No. 06701572.7 on Oct. 23, 2009; 6 pages.

Communication Pursuant to Article 94(3) EPC issued in European Application No. 06701572.7 on Mar. 8, 2010; 4 pages.

Communication Pursuant to Article 94(3) EPC issued in European Application No. 06701572.7 on Jul. 16, 2010; 4 pages.

Communication under Rule 71(3) EPC issued in European Application No. 06701572.7 on Apr. 4, 2011; 6 pages.

Extended European Search Report issued in European Application No. 11178908.7 on Nov. 15, 2011; 6 pages.

Official Action issued in Japanese Application No. 2007-550647 on Jul. 19, 2011; 3 pages.

Official Action issued in Japanese Application No. 2007-550647 on Nov. 25, 2011; 4 pages.

International Search Report and Written Opinion of the International Searching Authority issued in International Application No. PCT/CA2006/00058 on May 1, 2006; 11 pages.

International Preliminary Report on Patentability issued in International Application No. PCT/CA2006/00058 on Aug. 2, 2007; 8 pages.

Nguyen, P. et al.; "Low-Dimensional Lattice-Basis Reduction Revisited", ACM Transactions on Algorithms; vol. 5, No. 4, Article 46; Oct. 2009; 48 pages.

ANSI X9.62-1998, Public Key Cryptography for the Financial Services Industry: The Elliptic Curve Digital Signature Algorithm (ECDSA), American National Standard for Financial Services, American Bankers Association, Jan. 7, 1999; 195 pages.

ANSI X9.92-2002, Public-Key Cryptography for the Financial Services Industry: Digital Signature Algorithms Providing Partial Message Recovery; Part 1: Elliptic Curve Pintsov-Vanstone Signatures (ECPVS); Draft American National Standard; 2002; 65 pages.

Bleichenbacher; "Compressing Rabin Signatures"; Lecture Notes in Computer Science; Springer, Berlin; 2004; pp. 124-126; ISBN 3-540-20996-4.

Cheon, J.H. et al.; "Two Efficient Algorithms for Arithmetic of Elliptic Curves Using Frobenius Map"; Public Key Cryptography; First International Workshop on Practice and Theory in Public Key Cryptography—PCK 98; 1998; pp. 195-202.

Ciet, M. et al.; "Improved Algorithms for Efficient Arithmetic on Elliptic Curves Using Fast Endomorphisms"; Advances in Cryptology—Eurocrypt; International Conference on Theory and Application of Cryptographic Techniques; May 4, 2003; pp. 388-400.

Cohen, Henry, A Course in Computational Algebraic Number Theory, Springer, 1993, ISBN 0-387-55640-0.; pp. 83-96.

Deitel, H.M. et al., "C++ How to Program", 1994, Prentice-Hall, pp. 58-62.

Dirichlet,G.L., 'Verallgemeinerung eines Satzes aus der Lehrere von Kettenbrüchen nebst einigen Anwendungen auf die Theorie der Zahlen,' Berichtüber die zur Bekanntmachung geeigneter Verhandlungen der Königlich Preussischen Akademie der Wissenschaften zu Berlin; 1842; 4 pages; Certification and English Translation Report Concerning the Negotiations of the Royal Prussian Academy of Sciences at Berlin Suitable to be Announced; 1842; 5 pages.

Gallant, R., R. Lambert, S.A. Vanstone, 'Fast Point Multiplication on Elliptic Curves with Efficient Endomorphisms,' in Proceedings of Advances in Cryptology—CRYPTO 2001, Lecture Notes in Computer Science, vol. 2139, pp. 190-200, 2001.

Hankerson, Darrel et al.; "Guide to Elliptic Curve Cryptography"; ISBN 0-387-95273-X; 2004; 332 pages.

Hardy, G.H., E.M. Wright, An Introduction to the Theory of Numbers, Fifth Edition, Oxford: Oxford University Press, 2000; pp. 169-170.

IEEE P1363a Draft 12; Jul. 16, 2003; 177 pages.

Johnson, D. et al.; "The Elliptic Curve Digital Signature Algorithm (ECDSA)"; Certricom Corporation White Paper; 2001; pp. 2-56.

D.J. Johnson, A.J. Menezes, S.A. Vanstone, 'The Elliptic Curve Digital Signature Algorithm (ECDSA),' International Journal of Information Security, vol. 1, pp. 36-63, 2001.

Kelsy, J. et al.; "Side Channel Cryptanalysis of Product Ciphers"; Journal of Computer Security 8; 2000,; pp. 141-158.

Koblitz, Neal; "CM-Curves with Good Cryptographic Properties"; Advances in Cryptography—CRYPTO '91; 1991; pp. 279-287.

Koblitz, Neal; "Elliptic Curve Cryptosystems"; Mathematics of Computation,; vol. 48, No. 177; 1987; pp. 203-209.

Kocher, P. et al.; "Differential Power Analysis"; Advances in Cryptology—CRYPTO '99; Proceedings of the 19th Annual International Cryptology Conference; 1999; pp. 388-397.

Kocher, P. et al.; "Introduction to Differential Power Analysis and Related Attacks"; Cryptography Research; 1998, 5 pages.

Kocher, Paul C.; "Timing Attacks on Implementations of Diffie-Hellman, RSA, DSS, and Other Systems"; Advances in Cryptology—CRYPTO '96; Proceedings of the 16th Annual International Cryptology Conference; vol. 1109; 1996; pp. 104-113.

Koyama, K. et al.; "Elliptic Curve Cryptosystems and Their Applications"; IEICE Transactions on Information and Systems; vol. E75-D, No. 1; 1992; pp. 50-57.

Lercier, R.; "Finding Good Random Elliptic Curves for Cryptosystems Defined over Finite Fields"; Advances in Cryptography—EUROCRYPT '97; vol. 1233; 1997; pp. 379-392.

Lov'asz, L., 'An Algorithmic Theory of Numbers, Graphs and Convexity,' CBMSNSF Regional Conference Series in Applied Mathematics, Band 50, SIAM Publications, 1986; 98 pages.

Menezes, A. et al.; "The Implementation of Elliptic Curve Cryptosystems" of "Lecture Notes in Computer Science"; Advances in Cryptology—AUSCRYPT '90; International Conference on Cryptology; vol. 453; 1990; 14 pages.

Menezes, Alfred; "Elliptic Curve Cryptosystems"; A thesis presented to the University of Waterloo; 1992; pp. 1-121.

Menezes, Alfred. J.; "Handbook of Applied Cryptography"; CRC Press; 1997; pp. 613, 614, 618.

Miller, Victor C.; "Use of Elliptic Curves in Cryptography"; CRYPTO '85; LNCS 218; 1985; pp. 417-426.

Miyaji, A.; "Elliptic Curves Suitable for Cryptosystems"; IEICE Transactions on Fundamentals of Electronics, Communications and Computer Sciences; vol. E77-A, No. 1; 1994; pp. 98-104.

Moller, Bodo; "Algorithms for Multi-Exponentiation"; Selected Areas in Cryptography—SAC 2001; LNCS 2259; pp. 165-180.

Mueller, Volker; "Fast Multiplication on Elliptic Curves over Small Fields of Characteristic Two"; Submitted to Journal of Cryptology; 1997; pp. 1-19.

Nguyen, P., D. Stehl'e, 'Low-Dimensional Lattice-Basis Reduction Revisited,' in Proceedings of Algorithmic Number Theory—ANTS VI, Lecture Notes in Computer Science, vol. 3076, pp. 338-357, 2004.

Park, Y-H. et al.; "An Alternate Decomposition of an Integer for Faster Point Multiplication on Certain Elliptic Curves"; Proceedings of the 5th Internaitonal Workshop on Practice and Theory in Public Key Cryptosystems; Jan. 1, 2002; pp. 323-334.

Sakai, Y, et al.; "Algorithms for Efficient Simultaneous Elliptic Scalar Multiplication with Reduces Joint Hamming Weight Representation of Scalars"; Proceedings of the 5th Internaitonal Conference on Information Security; Sep. 30, 2002; pp. 484-499.

Schnorr, C.P.; "Efficient Signature Generation by Smart Cards"; Journal of Cryptology; vol. 4, No. 3; 1991; pp. 161-174.

Solinas, J., 'Low-Weight Binary Representations for Pairs of Integers,' Centre for Applied Cryptographic Research, Corr 2001-41, University of Waterloo, Ontario, Canada, 2001; 24 pages.

Solinas, Jerome A.; "An Improved Algorithm for Arithmetic on a Family of Elliptic Curves" of "Lecture Notes in Computer Science"; Advances in Cryptology—CRYPTO '97; 17th Annual International Cryptology Conference; 1997; pp. 357-371.

Solinas, Jerome A.; "Improved Algorithms for Arithmetic on Anomalous Binary Curves"; Technical Report; 1999; 69 pages.

U.S. Department of Commerce/National Institute of Standards and Technology; Federal Information Processing Standards Publication (FIPS PUB 180-2); "Secure Hash Standard"; Aug. 1, 2002; 75 pages.

U.S. Department of Commerce/National Institute of Standards and Technology; Federal Information Processing Standards Publication (FIPS PUB 186-2); "Digital Signature Standard (DSS)"; Jan. 27, 2000; 76 pages.

Waleffe, D. et al.; "CORSAIR: A Smart Card for Public Key Cryptosystems", Advances in Cryptology—CRYPTO '90; 1990; pp. 502-513.

Wang, C. et al.; "VLSI Architectures for Computing Multiplications and Inverses in GF (2m)"; IEEE Transactions on Computers; vol. C-34, No. 8; 1985; pp. 709-717.

Website: http://cr.yp.to/sigs.compress.html; publication date of website: unknown; retrieved on Jul. 15, 2009.

Wharton, John; "An Introduction to the Intel-MCS-51 Single-Chip Microcomputer Family"; Intel Corporation; Intel Application No. AP-69; 1980; 30 pages.

Yen, S.M, et al.; "Multi-Exponentiation"; IEEE Proceedings Comput. Digit. Tech.; vol. 141, No. 6; 1994; pp. 325-326.

Office Action issued in U.S. Appl. No. 11/333,296 on Apr. 20, 2009; 17 pages.

Office Action issued in U.S. Appl. No. 11/333,296 on Jun. 25, 2010; 7 pages.

Notice of Allowance issued in U.S. Appl. No. 11/333,296 on Jan. 21, 2011; 8 pages.

Office Action issued in U.S. Appl. No. 11/333,286 on Oct. 13, 2011; 9 pages.

File History of U.S. Appl. No. 11/333,296.

Examiner's Report issued in Canadian Application No. 2,592,870 on Aug. 9, 2012; 2 pages.

Communication Pursuant to Article 94(3) EPC issued in European Application No. 11178908.7 on May 30, 2012; 7 pages.

Extended European Search Report issued in European Application No. 12158215.9 on Jul. 2, 2012; 8 pages.

Notice of Final Rejection issued in Japanese Application No. 2007-550647 on Feb. 28, 2012; 8 pages.

Communication under Rule 71(3) EPC issued in European Application No. 11178908.7 on Mar. 19, 2013; 7 pages.

Office Action issued in Japanese Application No. 2011-230106 on Mar. 13, 2013; 10 pages.

* cited by examiner

ACCELERATED VERIFICATION OF DIGITAL SIGNATURES AND PUBLIC KEYS

PRIORITY CLAIM

This patent document claims the benefit of the priority of and is a Continuation-In-Part of U.S. application Ser. No. 11/333,296, filed on Jan. 18, 2006, which claims the benefit of the priority of U.S. Provisional Application No. 60/644,034, filed on Jan. 18, 2005. The above-identified applications are incorporated herein by reference in their entirety.

TECHNICAL FIELD

The following relates to computational techniques used in cryptographic algorithms.

BACKGROUND

The security and authenticity of information transferred through data communication systems is of paramount importance. Much of the information is of a sensitive nature and lack of proper control may result in economic and personal loss. Cryptographic systems have been developed to address such concerns.

Public key cryptography permits the secure communication over a data communication system without the necessity to transfer identical keys to other parties in the information exchange through independent mechanisms, such as a courier or the like. Public key cryptography is based upon the generation of a key pair, one of which is private and the other public that are related by a one way mathematical function. The one way function is such that, in the underlying mathematical structure, the public key is readily computed from the private key but the private key cannot feasibly be ascertained from the public key.

One of the more robust one way functions involves exponentiation in a finite field where an integer k is used as a private key and the generator of the field a is exponentiated to provide a public key $K=\alpha^k$. Even though $\alpha$ and K are known, the underlying mathematical structure of the finite field makes it infeasible to obtain the private key k. Public key cryptography may be used between parties to establish a common key by both parties exchanging their public keys and exponentiating the other parties public key with their private key. Public key cryptography may also be used to digitally sign a message to authenticate the origin of the message. The author of the message signs the message using his private key and the authenticity of the message may then be verified using the corresponding public key.

The security of such systems is dependent to a large part on the underlying mathematical structure. The most commonly used structure for implementing discrete logarithm systems is a cyclic subgroup of a multiplicative group of a finite field in which the group operation is multiplication or cyclic subgroups of elliptic curve groups in which the group operation is addition.

An elliptic curve E is a set of points of the form (x, y) where x and y are in a field F, such as the integers modulo a prime p, commonly referred to as Fp, and x and y satisfy a non-singular cubic equation, which can take the form $y^2=x^3+ax+b$ for some a and b in F. The elliptic curve E also includes a point at infinity, indicated as O. The points of E may be defined in such a way as to form a group. The point O is the identity of the group, so that $O+P=P+O=P$ for any point P in E. For each point P, there is another point, which we will write as −P, such that $P+(-P)=P+(-P)=O$. For any three points P, Q, R in E, associativity holds, which means that $P+(Q+R)=(P+Q)+R$. Identity, negation and associativity are the three axiomatic properties defining a group. The elliptic curve group has the further property that it is abelian, meaning that $P+Q=Q+P$.

Scalar multiplication can be defined from addition as follows. For any point P and any positive integer d, dP is defined as $P+P+\ldots+P$, where d occurrences of P occur. Thus $1P=P$ and $2P=P+P$, and $P=P+P+P$, and so on. We also define $0P=O$ and $(-d)P=d(-P)$.

For simplicity, it is preferable to work with an elliptic curve that is cyclic (defined below) although in practice, sometimes a cyclic subgroup of the elliptic curve is used instead. Being cyclic means that there is a generator G, which is a point in the group such that every other point P in the group is a multiple of G, that is to say, P=dG, for some positive integer d. The smallest positive integer n such that nG=O is the order of G (and of the curve E, when E is cyclic). In cryptographic applications, the elliptic curves are chosen so that n is prime.

In an elliptic curve cryptosystem (ECC), the analogue to exponentiation is point multiplication. Thus if a private key is an integer k, the corresponding public key is the point kP, where P is a predefined point on the curve that is part of the system parameters. The seed point P will typically be the generator G. The key pair may be used with various cryptographic algorithms to establish common keys for encryption and to perform digital signatures. Such algorithms frequently require the verification of certain operations by comparing a pair of values as to confirm a defined relationship, referred to as the verification equality, between a set of values.

One such algorithm is the Elliptic Curve Digital Signature Algorithm (ECDSA) used to generate digital signatures on messages exchanged between entities. Entities using ECDSA have two roles, that of a signer and that of a verifier. A signer selects a long-term private key d, which is an integer d between 1 and n−1 inclusive. The integer d must be secret, so it is generally preferable to choose d at random. The signer computes Q=dG. The point Q is the long-term public key of the signer, and is made available to the verifiers. Generally, the verifiers will have assurance generally by way of a certificate from a CA, that Q corresponds to the entity who is the signer. Finding the private key d from the public key Q is believed to an intractable problem for the choices of elliptic curves used today.

For any message M, the signer can create a signature, which is a pair of integers (r, s) in the case ECDSA. Any verifier can take the message M, the public key Q, and the signature (r, s), and verify whether it was created by the corresponding signer. This is because creation of a valid signature (r, s) is believed to possible only by an entity who knows the private key d corresponding to the public key Q.

The signing process is as follows. First, the signer chooses some integer k in the interval [1, n−1] that is to be used as a session, or ephemeral, private key. The value k must be secret, so generally it is preferable to choose k randomly. Then, the signer computes a point R=kG that has co-ordinates (x, y). Next, the signer converts x to an integer x' and then computes r=x' mod n, which is the first coordinate of the signature. The signer must also compute the integer e=h(M) mod n, where h is some hash function, generally one of the Secure Hash Algorithms (such as SHA-1 or SHA-256) defined in Federal Information Processing Standard (FIPS) 180-2. Finally, the second coordinate s is computed as s=(e+dr)/s mod n. The components (r, s) are used by the signer as the signature of the message, M, and sent with the message to the intended recipient.

The verifying process is as follows. First the verifier computes an integer e=h(M) mod n from the received message.

Then the verifier computes integers u and v such that u=e/s mod n and v=r/s mod n. Next, the verifier computes a value corresponding to the point R that is obtained by adding uG+vQ. This has co-ordinates (x, y). Finally the verifier converts the field element x to an integer x' and checks that r=x' mod n. If it does the signature is verified.

From the above, the verification of an ECDSA signature appears to take twice as long as the creation of an ECDSA signature, because the verification process involves two scalar multiplications, namely uG and vQ, whereas signing involves only one scalar multiplication, namely kG. Elliptic curve scalar multiplications consume most of the time of these processes, so twice as many of them essentially doubles the computation time. Methods are known for computing uG+vQ that takes less time than computing uG and vG separately. Some of these methods are attributed to Shamir, some to Solinas, and some to various others. Generally, these methods mean that computing uG+vQ can take 1.5 times as long as computing kG.

Another commonly used method to accelerate elliptic curve computations is pre-computing tables of multiples of G. Such pre-computed tables save time, because the point G is generally a fixed system parameter that is re-used repeatedly. The simplest pre-compute table consists of all multiples $2^j$ G for j from 0 to t, where t is the bit length of n. With such a pre-computed table, computing an arbitrary multiple kG can be done with an average of t/2 point additions or less. Roughly, this a threefold improvement over the basic method of computing kG, which clearly demonstrates the benefit of pre-computation. Generally speaking, larger pre-computed tables yield better time improvements. The memory needed to store the pre-computed tables has a significant cost. Therefore, implementers must balance the benefit of faster operations with the extra cost of larger tables. The exact balance generally depends of the relative importance of speed versus memory usage, which can vary from one implementation to another.

Pre-computation can also be applied to the public key Q. Generally, the public key Q tends to vary more often than G: as it is different for each correspondent, whereas G is always fixed for a given system. Therefore the cost of one-time pre-computation for Q is amortized over a smaller number of repeated run-time computations involving Q. Nevertheless, if Q is to be used more than once, some net savings on time will be achieved. Public keys that are heavily used include those of certification authorities (CA), especially root, trusted or anchor CA public keys (that are pre-installed into a system). Therefore, pre-computation may be worthwhile for CA elliptic curve public keys where, for example, the protocol requires verification of a CA's certificate. Another difference between pre-computations of Q versus G is the cost of storing or communicating the pre-computed tables. Each public key Q requires its own pre-computed table. In a system with many distinct public keys, these costs may accumulate to the point that any benefit of faster computation is offset by the need to store or communicate keys. The net benefit depends on the relative cost of time, memory and bandwidth, which can vary tremendously between implementations and systems. Again, in the case of CA public keys, especially root, trusted or anchor CA keys, these keys tend to be fewer in number than end-entity public keys, so that the cost of pre-computation will generally be less and amortised over more operations.

Tables of multiples of points are not merely useful during pre-computation. In practice, such tables are commonly generated at run-time, during an initial phase of each computation. The savings provided by these tables is essentially that of avoiding certain repetitious operations that occur within a single computation. A single computation has less internal repetitions than two distinct computations have in common, so that saved repetition amount to less than pre-computation. Nevertheless, it has been found that with a judicious choice of table, the time need for a single computation can be reduced. The table takes time to compute, and computation of the table cannot be amortized over multiple computations, so is incurred for every computation. Experience has shown that particular tables decrease the amount of time needed because computing the table takes less time than the repetition operations that would have otherwise been needed. Usually, there is an optimum size and choice of table. Another cost of such tables is the memory needed to temporarily store the table. The cost of such memory may affect the optimal choice of table. Windowing methods are examples of such tables computed on the fly.

Not withstanding all of the above known techniques for efficient implementation, further efficiency improvements are desirable. In particular, the efficiency of verifying of ECDSA signatures is particularly desirable. Extensive pre-computation allows ECDSA signatures to be generated very quickly. In fact, ECDSA signature generation is one of the fastest digital signature generation algorithms known. On the other hand, ECDSA signature verification is relatively slower, and there are other signature algorithms have similar verification times to ECDSA. Improvement of ECDSA verification time is therefore important, especially for environments where verification time is a bottleneck.

ECC public key schemes are often chosen for being particularly efficient and secure. For instance, it has been demonstrated that smaller parameters can be used in ECC systems than RSA or other discrete log systems at a given security level. As such, many solutions using ECC have been developed.

The EC Pintsov-Vanstone Signature (ECPVS) scheme, as presented in the ASC X9.92 Draft, provides a digital signature scheme with partial message recovery. PV signatures can be done in other discrete log implementations, however EC is considered the most desirable. The ECPVS scheme has been used to provide a level of confidentiality by enabling a portion of the message being signed to be "hidden" within one of the resultant signature components.

In general, there is a need to enhance the efficiency of performing a computation to verify that a value corresponds to the sum of two of the values.

DRAWING DESCRIPTIONS

DETAILED DESCRIPTION

The following discussion includes reference to verification of digital signatures, in particular those signatures generated using ECDSA. It will be apparent however that the techniques described are applicable to other algorithms in which verification of a pair of values representative of points on an elliptic curve is required to groups other than elliptic curve groups. Therefore the accompanying description of the embodiments shown is exemplary and not exhaustive.

Figure 1:
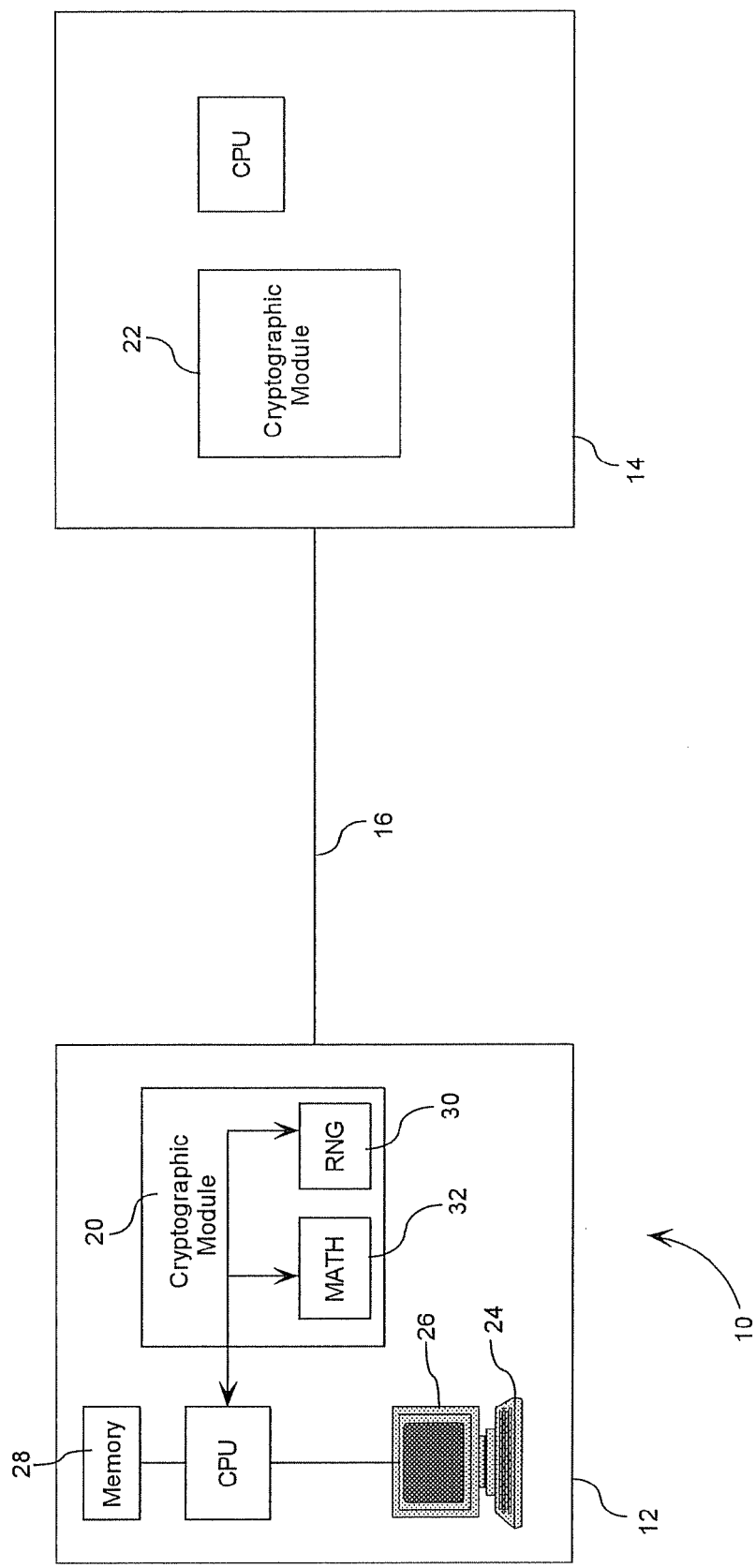
FIG. 1 is a schematic representation of a data communication system.

Referring therefore to FIG. 1, a data communication system 10 includes a pair of correspondents 12, 14 interconnected by a transmission line 16. The correspondents 12, 14 each include cryptographic modules 20, 22 respectively that are operable to implement one of a number of cryptographic functions. The modules 20, 22 are each controlled by CPU's incorporated in the correspondents 12, 14 and interfacing between input devices, such as a keyboard 24, a display device 26, such as a screen and a memory 28. Each cryptographic module includes internal processing capability including a random number generator 30 and an arithmetic processor 32 for performing elliptic curve computations such as point addition. It will be appreciated that the correspondents 12, 14 may be general purpose computers connected in a network or specialised devices such as cell phones, pagers, PDA's or the like. The communication link 16 may be a land line or wireless or a combination thereof. Similarly the cryptographic modules 20, 22 may be implemented as separate modules or incorporated as an application within the CPU.

In the present example, the correspondent 12 prepares a message M which it wishes to sign and send to the correspondent 14 using an elliptic curve cryptosystem embodied within the modules 20, 22. The parameters of the system are known to each party including the field over which the curve is defined (in the present example Fp where p is a prime), the underlying curve, E, the generator point G that generates the elements that form the group in which crypto operations are performed and therefore defines the order, n, of the group, and a secure hash function H, generally one of the Secure Hash Algorithms (such as SHA-1 or SHA-256) defined in Federal Information Processing Standard (FIPS) 180-2. Each element is represented as a bit string having a maximum bit length sufficient to represent each element in the group.

Figure 2:
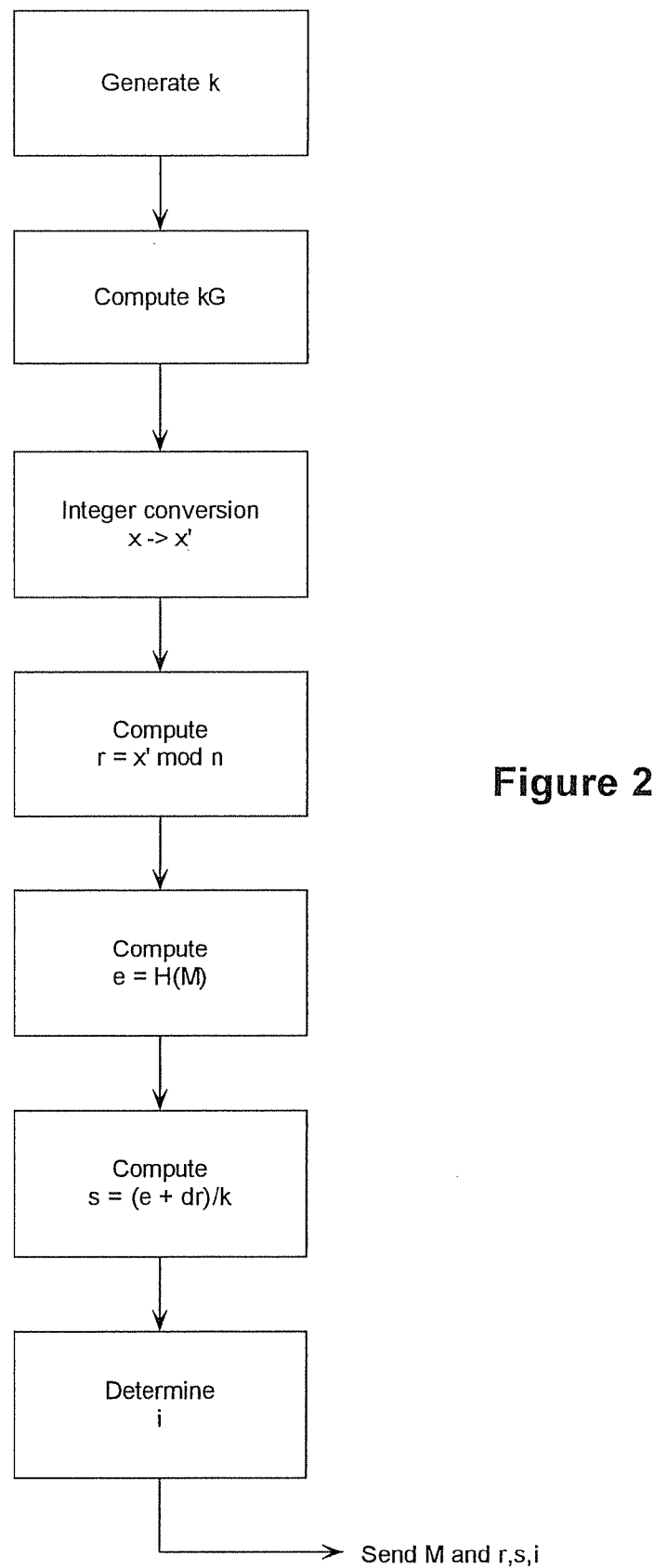
FIG. 2 is a flow chart illustrating the steps in performing a signature for an ECDSA signature scheme.

The steps taken to sign the message are shown in FIG. 2. Initially therefore the correspondent generates an integer k by the random number generator 30 and utilises the arithmetic unit 32 to compute a point R=kG that has co-ordinates (x, y). The correspondent 12 converts the co-ordinate x to an integer x' and computes r=x' mod n, which is the first component of the signature. The correspondent 12 also computes the integer e=H(M) mod n, where H is the secure hash function. Finally, the second component s is computed as s=(e+dr)/k mod n.

In addition to the components r and s, the signature includes information i to permit the co-ordinates representing the point R to be recovered from the component r. This information may be embedded in the message M, or forwarded as a separate component with r and s and will be used by the verifier to compute the value R. If the elliptic curve is defined over a field F of prime order p, and the elliptic curve E is cyclic or prime order n, then i can generally be taken as y mod 2, i.e., a zero or one. The indication i is required during recovery R, where the verifier sets x=r. It is very likely that x=r because n and p are extremely close for typical implementations. Given x, there are exactly two values y such that (x, y) is on the curve, and these two values y and y' have different values mod 2. Thus i is just a single bit whose value indicates which of the y's is to be used, and adds relatively little cost to the signature.

Figure 3:
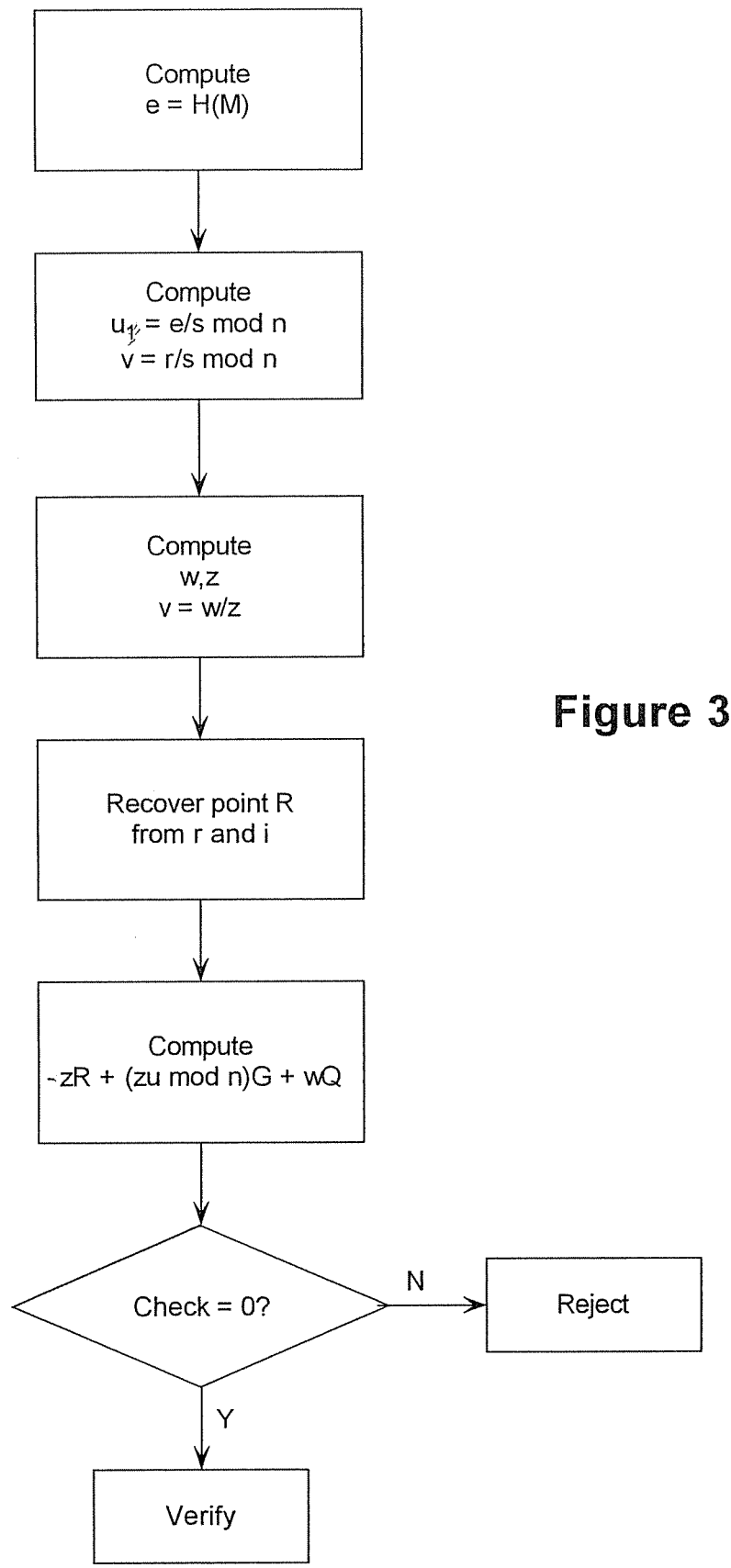
FIG. 3 is a flow chart showing the verification of a ECDSA signature.

Once the message is signed it is forwarded together with the components r, s, and i across the link 16 to the recipient correspondent 14. To verify the signature the steps set out in FIG. 3 are performed. First the correspondent 14 computes an integer e=H(M) mod n. Then the correspondent utilises the arithmetic unit 32 to compute a pair of integers u and v such that u=e/s mod n and v=r/s mod n.

The correspondent 14 also computes a pair of integers w and z using an iterative algorithm such that the maximum bit lengths of w and z are each less than the maximum bit length of the elements of the group, and such that v=w/z mod n. The bit lengths of w and z are preferably about one half the bit length of the elements. Such w and z can be found conveniently with the extended Euclidean algorithm and stopping at an appropriate point, typically half-way where w and v are half the bit length of the elements. Such an algorithm is exemplified, for example as Algorithm 3.74 in Guide to Elliptic Curve Cryptography by Henkerson, Menezes and Vanstone published by Springer under ISBN 0-387-95273, which represents a quantity k as $k=k_1+k_2\lambda$ mod n, where the bit lengths of $k_1$ and $k_2$ are about half the length of n. This equation can be re-written as $\lambda=(k-k_1)/k_2$ mod n. By setting k=1 and $\lambda$=v, then the above referenced Algorithm 3.74 can be used to obtain n established for the system, k set to 1 and the value for v used as the variable input. The output obtained $k_1$ $k_2$ can then be used to compute $w=1-k_1$ and $k_2$ used as $w=1-k_1$ and $z=k_2$.

Thus, the arithmetric unit 32 is used to implement the following pseudo-code to obtain the values of w and z.

Let r0=n and t0=0.
Let r1=v and t1=1.
For i>1, determine ri, ti as follows:
Use the division algorithm to write r_(i−1)=qi r_(i−2)+ri, which defines ri.
Let ti=t_(i−1)+qi t_(i−2).
Stop as soon as ri<sqrt(n)=n^(½), or some other desired size.
Set w=ri and z=ti. Note that ri=ti v mod n, so w=z v mod n, so v=w/z mod n, and both w and z have about half the bit length of n, as desired.

The correspondent 14 also recovers a value corresponding to the point R utilising the information i. In its simplest form this is obtained by substituting the value of r received in the curve and determining which of the two possible values of y correspond to the sign indicated by the bit i.

With the value of R recovered, the verification of the ECDSA, namely that R=uG+vQ, may proceed with a revised verification by confirming that the verification equality −zR+(zu mod n)G+wQ=O. The verification equality −zR+(zu mod n)G+wQ involves a combination of group operations on each of the ephemeral public key R, generator G and long-term public key Q and can be computed efficiently because z and w are relatively small integers. As will be described below, various of the methods for computing a sum faster than its parts can be used. The multiple (zu mod n) is full size, but within the context of a system such as the ECDSA in which the points have varying longevity, the point G may be considered fixed or recurring. In this case the computation can be accelerated with a precomputed table for G, which may be stored in the memory 28 and accessed by arithmetic unit 32 as needed. The representations of the points −zR and wQ which cannot effectively be precomputed have smaller bit lengths and therefore less time consuming computation. Assuming the computation returns a value O, the signature is assumed to be verified.

A number of different known techniques may be utilised to compute the required relationship, each of which may be implemented using the arithmetic processor 32. Each offers different advantages, either in speed or computing resources, and so the technique or combination of techniques will depend to a certain extent on the environment in which the communication system is operating. For the sake of comparison, it will be assumed that u and v are integers of bit length t. Computing uG and vQ separately requires about 3t/2 point operations, assuming no pre-computation, for a total of about 3t point operations. Computing uG+vQ, which is the verification normally used for ECDSA, require t doublings, some of which can be simultaneous. Each of u and v are expected to have about t/2 bits set to one in their binary representation. In basic binary scalar multiplication, each bit of one requires another addition. (In more advanced scalar multiplication, signed binary expansion are used, and the average number of additions is t/3.) The total number of point operations is therefore t+(2(t/2))=2t on average as simultaneous doubling has saved t doublings.)

The revised verification instead uses a computation of a combination of the form aG+wQ+zR, where a is an integer of bit length t representative of the value zu mod n and w and z are integers of bit length about (t/2). Organising the verification computation in this way permits a number of efficient techniques to be used to reduce the number of point operations. An efficient way to compute this is to use a simultaneous doubling and add algorithm. For example, if the relationship 15G+20Q+13R is to be computed it can be done in stages as 2Q; G+2Q; G+2Q+R; 2G+4Q+2R; 3G+4Q+2R; 3G+5Q+2R; 3G+5Q+3R; 6G+10Q+6R; 7G+10Q+6R; 14G+20Q+12R; 15G+20Q+13R, for a total of 12 point additions, which is fewer than the method of generic scalar multiplication for each term separately. The main way that this method uses less operations is when it does simultaneous doubling, in steps as going from G+2Q+R to 2G+4Q+2R. In computing each term separately three operations would be used corresponding to this one operation. In fact, three simultaneous doubling were used, each saving two operations, so simultaneous doubling account precisely for all the savings. The number of doublings to compute the combination is governed by the length of the highest multiple, so it is t. The number of additions for a is (t/2), on average, and for Q and R it is (t/4) each on average. The total, on average, is t+(t/2)+(t/4)+(t/4)=2t. The algorithm is further exemplified as Algorithm 3.48 of the Guide to Elliptic Curve Cryptography detailed above.

Although there does not appear to be any savings over the previous method, which also took 2t point operations, advantage can be taken of the fact that in practice, for ECDSA, the generator G is constant. This allows the point J=2^m G to be computed in advance, and stored in memory 28 for future use. If m is chosen to be approximately t/2, then a a'+a" 2^m, where a' and a" are integers of bit length about (t/2). Accordingly, aG+wQ+zR can be written as a'G+a"J+wQ+zR. In this form, all the scalar multiples have bit length (t/2). The total number of doublings is thus (t/2). Each of the four terms contributes on average (t/4) additions. The total number of point operations, on average, is the t/2+4 (t/4)=3t/2.

Figure 4:
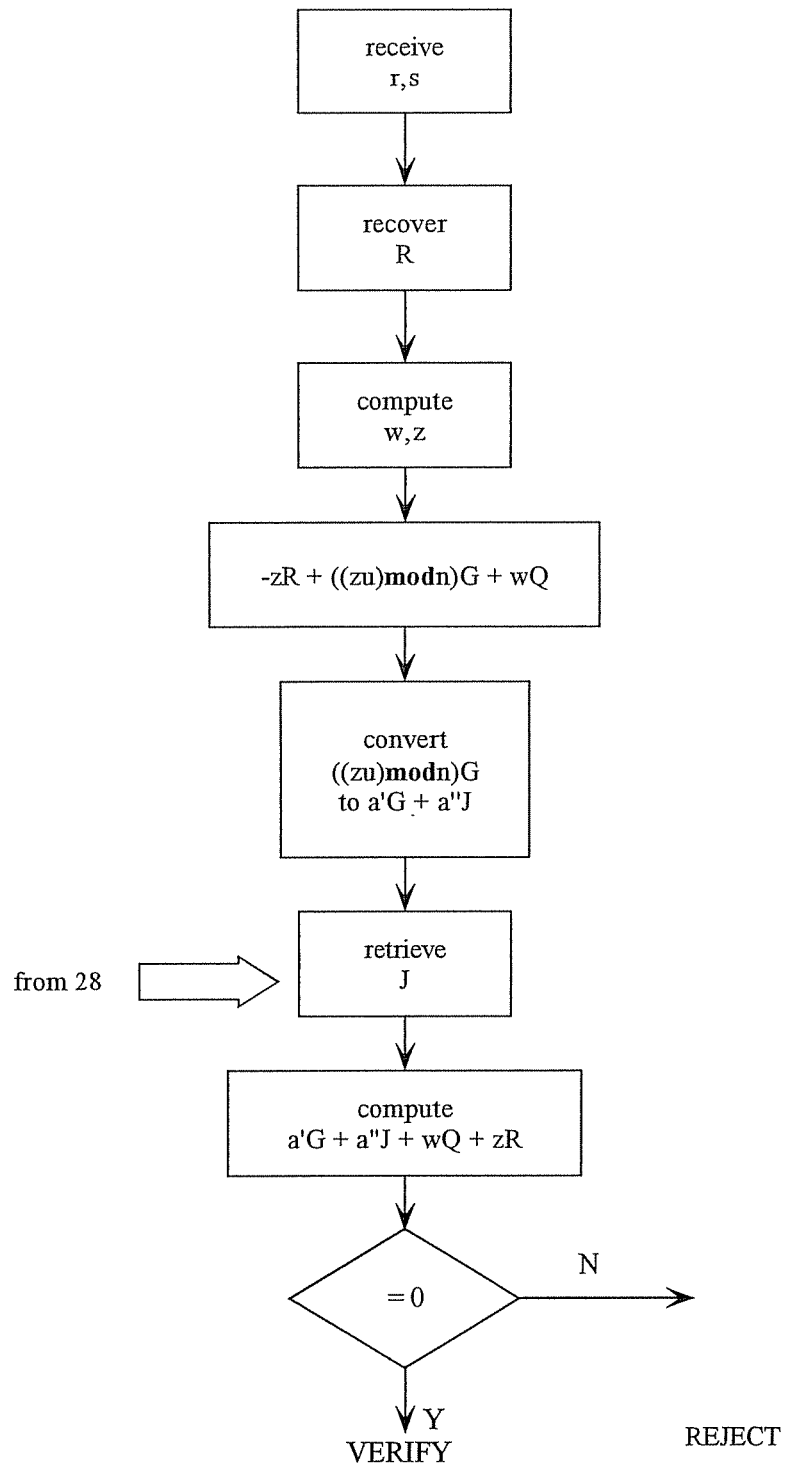
FIG. 4 is a flow chart showing the verification of an ECDSA signature using a precomputed value.

Accordingly, to verify the signature r,s, as shown schematically in FIG. 4, the recipient computes w, and z as described above, determines the value of a' and a" and performs a double and add computation to obtain the value of the verification representation. If this corresponds to the group identity, the verification is confirmed.

With the conventional verification equation approach of computing uG+vQ, the multiple v will generally be full length t, so the pre-computed multiple J of G will not help reduce the number of simultaneous doublings.

Therefore, by pre-computing and storing the single point J, verifying using the relationship −zR+(zu mod n)G+wQ=O allows an ECDSA signature to be verified in 25% less time. In other words, 33% more signatures can be verified in a given amount of time using the embodiment described above.

Figure 5:
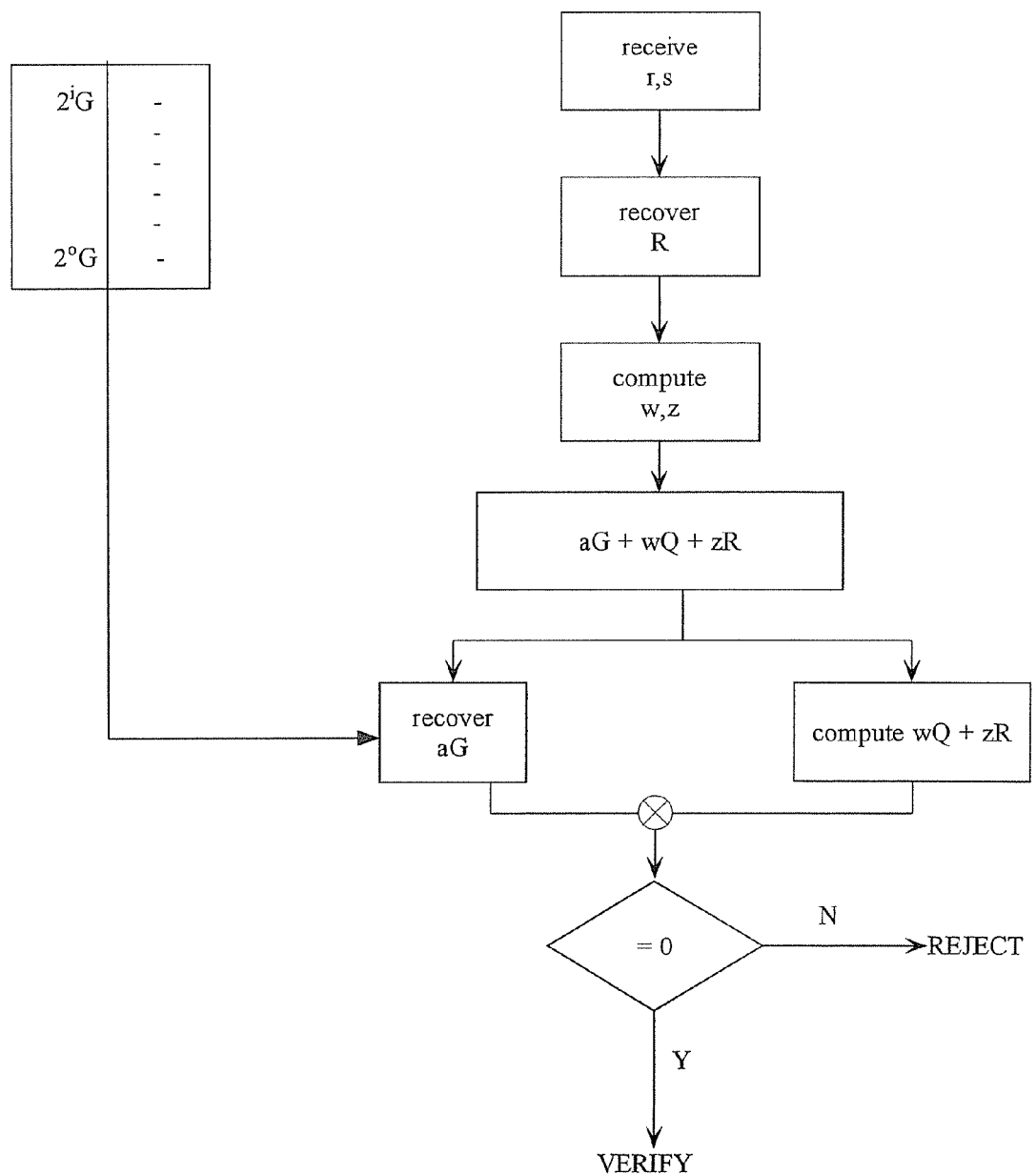
FIG. 5 is a flow chart showing the verification of an ECDSA signature using a table of precomputed values.

Alternatively, many implementations have sufficient memory 32 to pre-compute and store essentially all power of two multiples of G, essentially making it unnecessary to apply doubling operations to G. In such situations uG+vQ can be computed with t doublings of Q and (t/2) additions for each of G and Q. The total is still 2t operations. However, as shown in FIG. 5, the value of aG can be retrieved from the precomputed table stored in memory 32 so that computing aG+wQ+zR, can be attained with (t/2) doublings for the wQ and zR, no doublings for G, t/2 additions for G, and t/4 additions for each of Q and R. The total is 3t/2 operations. The savings are the same as described with FIG. 4, when only one multiple of G was pre-computed and stored.

When signed binary expansions are used, then computing uG+vQ (without any pre-computation) requires about t doublings and (t/3) additions for each of G and Q, for a total of (10/6)t operations, on average. When signed binary expansions are used to find a'G+a"J+wQ+zR, about t/2 doublings are needed, and (t/6) additions for each of G, J, Q and R, for a total of (7/6)t operations, on average. The time to verify using the verification representation described above is 70% compared to without, or 30% less. This allows about 42% more signatures to verified in a given amount of time. The advantage of verifying using the revised verification representation is increased when combined with a more advanced technique of scalar multiplication referred to as signed binary expansions. This technique is very commonly used today in elliptic curve cryptography, so today's existing implementations stand to benefit from adoption of the verification representations.

Accordingly, it will be seen that by reorganizing the verification equation so that signature variables have a reduced bit length, the speed of verification may be increased significantly.

Figure 6:
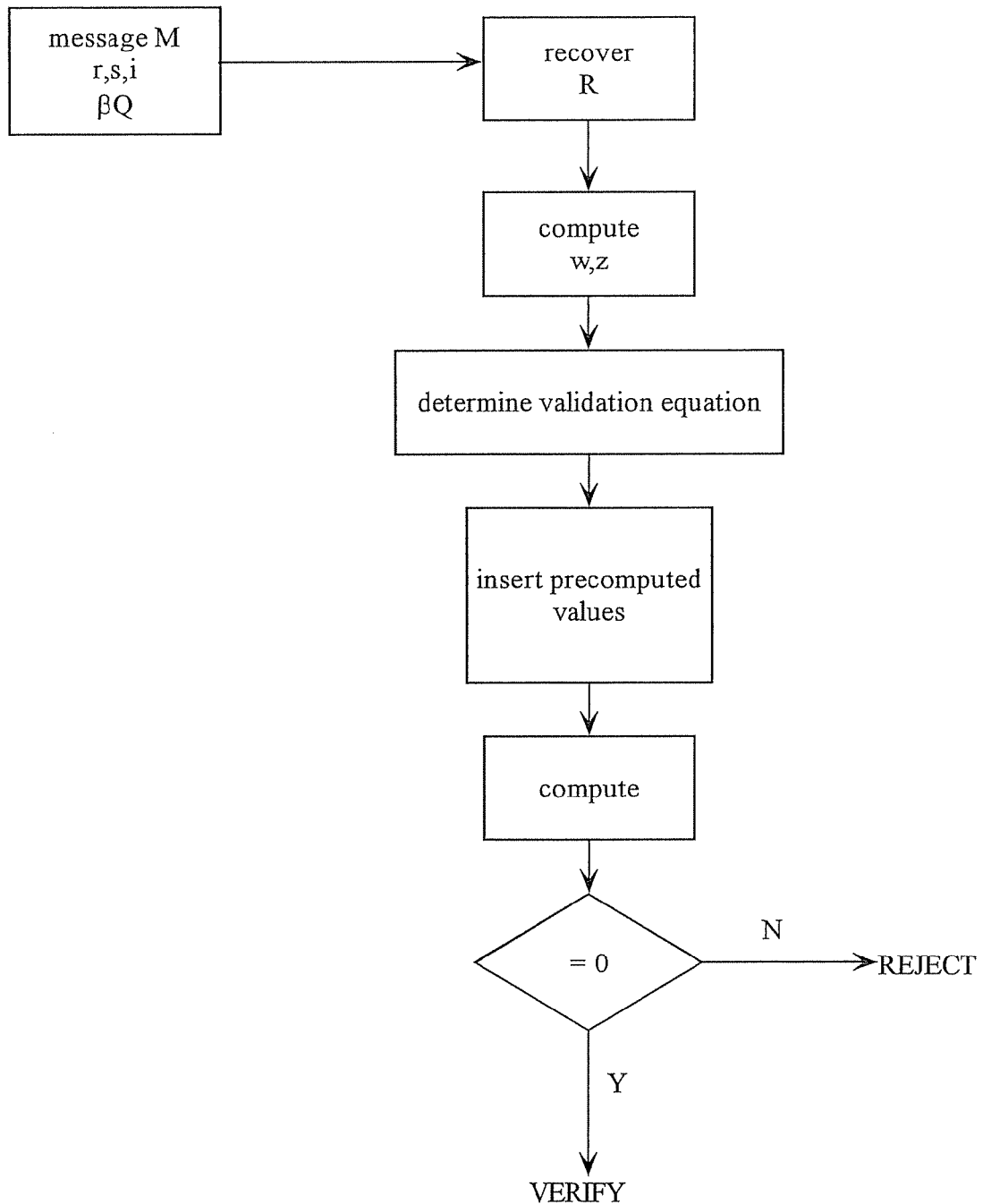
FIG. 6 is a flow chart showing the verification of an ECDSA signature using a precomputed value provided by the signer

In the above embodiments, the recipient performs computations on the components r,s. To further accelerate signature verification as shown in FIG. 6, a signer may provide a pre-computed multiple of the public key Q to the verifier. The verifier can use the pre-computed multiple to further accelerate verification with Q. In this embodiment the verifier determines an equivalent equation to the ECDSA verification equation in the form $aR+bG+cQ=0$, where a is approximately $n^{1/3}$ and represents $-z$, b is approximately n and represents $-zu \bmod n$, and c is approximately $n^{2/3}$ and represents w. This can be done using the extended Euclidean algorithm as described above and stopping when the bit length of w is twice that of z. Again, therefore, the signor signs the message M and generates the signature components r,s. It also includes the identifier i in the message forwarded to the verifier. The signor pre-computes a multiple $\beta Q$ where the scalar multiple $\beta$ is a power of two nearest to $n^{1/3}$ and forwards it with the signature.

Upon receipt, the verifier computes w and z. The verifier then determines $c=c'+c''\beta$ and $b=b'+b''\beta+b'''\beta^2$. In addition, since G is a fixed parameter, the verifier has pre-computed multiples of G of the form $\beta G$ and $\beta^2 G$. If n is approximately $2^t$, then the verifier needs just t/3 simultaneous doubles to compute $aR+bG+cQ$. The verification can proceed on the basis $aR+(b'+b''\beta+b'''\beta^2)G+(c'+c''\beta)Q=0$. The precomputed values for G and Q can then be used and the verification performed. The verifier will need 2t/3 point additions, assuming that signed NAF is used to represent a, b and c. The total number of point operations is thus t, which represents a further significant savings compared to 3t/2 with the present invention and without the pre-computed multiple of Q such as described in FIG. 4 and compared to t using the conventional representations and without any pre-computed multiple of Q.

Given a pre-computed multiple of both Q and G, then $uG+vQ$ can be computed with $(t/2)+4(t/4)=3t/2$ point operations using conventional representations. When pre-computed multiples of Q are feasible, then the signing equation, in the form above, again provide a significant benefit. The analyses above would be slightly modified when signed binary expansions are used.

With yet other known advanced techniques for computing linear combinations of points, some of which are discussed below, the use of the relationship allows signature verification to take up to 40% less time.

When implementing scalar multiplication and combinations, it is common to build a table at run-time of certain multiples. These tables allow signed bits in the representation of scalar multiple to be processed in groups, usually called windows. The table costs time and memory to build, but then accelerates the rest of the computation. Normally, the size of the table and associated window are optimized for overall performance, which usually means to minimize the time taken, except on some hardware implementation where memory is more critical. A full description and implementing algorithms for such techniques is to be found in *Guide to Elliptic Curve Cryptography*, referenced above at pages 98 et.seq.

Such run-time tables, or windowing techniques, for scalar multiplication techniques can be combined with the revised verification equation in the embodiments described above. When using such tables, the savings are approximately the same as outlined above. The reason the savings are similar is the following simple fact. Tables reduce the number of adds, by pre-computing certain patterns of additions that are likely occur repeatedly, whereas the use of the revised verification relationship reduces the number of doubles by providing for more simultaneous doubling. In fact, when using tables, the number of adds is reduced, so the further reduction of the doubles provided by using the revised verification relationship has even more impact.

By way of an example, a common approach to tables, is to use a signed NAF window of size 5. Building a table for such a NAF requires 11 adds. In the example above where the signer sends a pre-computed multiple uQ of Q, the verifier can build tables for R, Q and uQ, at a cost of 33 adds. It is presumed that verifier already has the necessary tables built for G. Using the pre-computed doubles, the verifier only needs t/6 simultaneous additions for verification. These savings improve as the key size increases. For the largest key size in use today, the savings are in the order of 40%. Such tables do of course require the necessary memory 32 and so selection of the appropriate techniques is governed by the hardware available.

Similarly, computation techniques known as joint sparse forms could be used for computational efficiency.

As described above, the integers w, z were found using the extended Euclidean algorithm. Alternative iterative algorithms may be used, including the continued fractions approach. In the continued fractions approach, which is essentially equivalent to the extended Euclidean algorithm, one finds a partial convergent $\gamma/\delta$ to the fraction v/n, such that $\delta$ is approximately $n^{1/2}$. A property of the partial convergent is that $|\gamma/\delta - v/n| < 1/\delta^2$. Multiplying this inequality by $\delta n$ gives $|\gamma n - v\delta| < n/\delta$, which is approximately $n^{1/2}$. Now set $z=\delta$ and $w=\gamma n-v\delta$. It is easy to check that $v=w/z \bmod n$, and note that w and z have the desired size.

As noted above, a conventional ECDSA signature, does not include the point R but instead, it includes an integer x' obtained from $r=x \bmod n$, where $R=(x, y)$. The verifier therefore needs to recover R.

The method to recover R discussed above is to supplement the signature (r, s) with additional information i. This information can be embedded in the message, for example. The verifier can use r and i to compute R. When p>n, there is a negligible chance that x'>n and consequently r=x−n. If however such a case does occur, the verification attempt will fail. Such a negligible failure rate for valid signatures can be accepted, or dealt with in the following manner.

Figure 7:
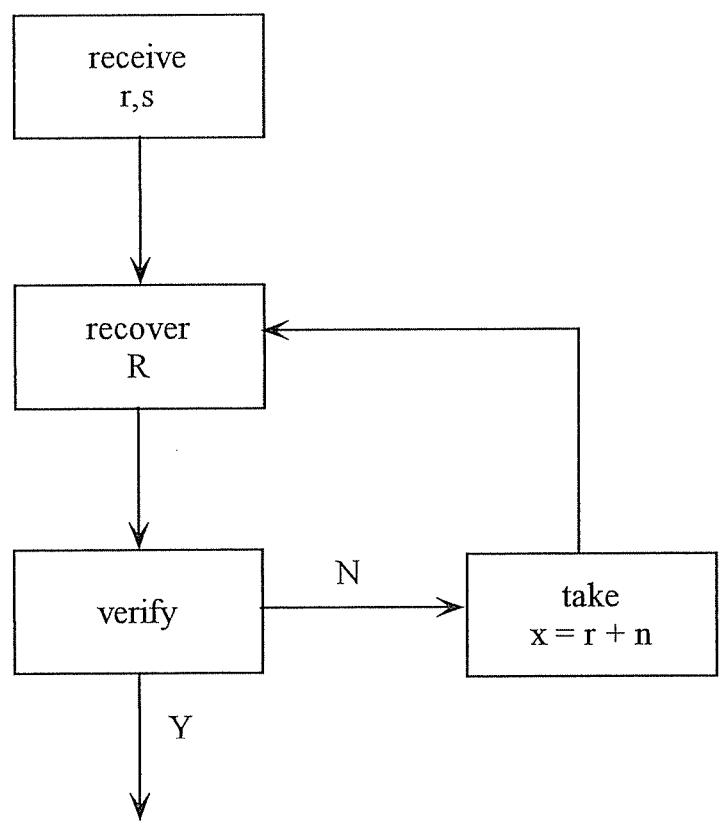
FIG. 7 is a flow chart showing steps taken by a verifier upon failing to verify.
Figure 8:
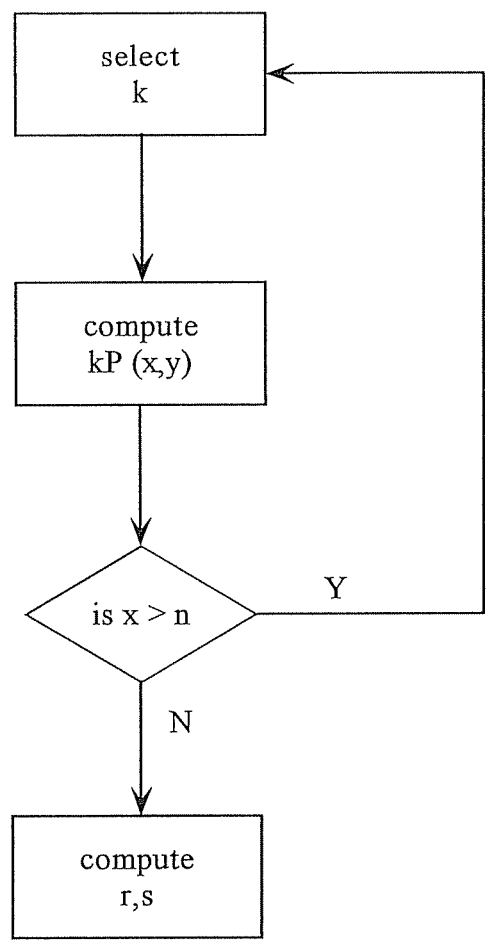
FIG. 8 is a flow chart showing steps taken by a signor to simplify verification.

As shown in FIG. 7, upon failure of the verification, at the verifier's expense the verifier can try x=r+n, and repeat the verification for another value of R, which will succeed in this particular case. Continued failure to verify will lead to rejection of the signature. Alternatively, as shown in FIG. 8 the signer can detect when x>n, which should happen negligibly often, and when this happens generate a different k and R. In either of the approaches, the problem arises so rarely that there is negligible impact on performance.

Other techniques for determining R can be utilized. In non-cyclic curves, there is a cofactor h, which is usually 2 or 4 in practice. This can lead to multiple possible values of x. The probability that r=x is approximately 1/h. In other situations, we will generally have r=x−n (if h=2), or more generally r=x−mn where (m is between 0 and h−1). Because p is approximately hn, then except in a negligible portion of cases there will be h possible values of x that are associated with r. To make recovery of x, and hence R easier, the signer can compute m and send it to the verifier within the message or as a further signature component. Alternatively, the verifier can make an educated guess for m. This can be illustrated in the case of h=2.

Corresponding to r is a correct x and a false value $x_f$. The false value $x_f$ has an approximately ½ chance of not corresponding to a value of the x-coordinate on E, and a further 1/h chance of not corresponding to a multiple of G. If one of the two values for x is invalid, either by not being on E or if it is not having order n, both of which can be efficiently checked, then that value can be eliminated. Thus at least ¾ of the time, the verifier will easily find the correct x. The remaining ¼ of the time at maximum, the verifier will not know which of the two x-values to try. If the verifier can guess one of the x values to verify, half the time, this guess will be right and the signature will verify, and the other half of the time, the first signature attempt will fail and the verifier must try the other x value. Therefore the probability that the verifier must verify two signatures is ⅛. Despite this probability of two verifications, the average verification is still improved. This can still provide the verifier time savings on average. If an accelerated verification takes 70% as long as a normal verify, but 12.5% of the verifies require twice as long as an accelerated verify, then the average time is 79% of a normal verify. Furthermore, as outlined further below, the signer can assist by providing m for the verifier or by doing the extra work of trying both values to ensure that only one m is valid.

A similar method may be utilized with a cofactor h=4. In fact, a higher value of h reduces the probability of each of the potential x values from being valid. There are more potential x values, but the analysis shows a similar benefit to the verifier. There are three false values of x, and each has a probability of ⅛ of appearing valid with a fast check. The chance that no false values appear to be a valid x with a fast check is thus $(⅞)^3$ which is about 77%. Most of the remaining 23% of the time, just one of the false x values will appear valid and potentially require a full signature verification.

Figure 9:
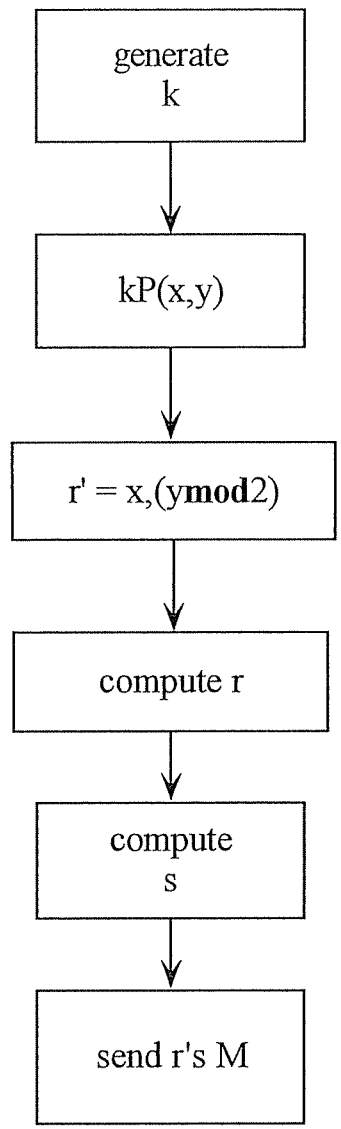
FIG. 9 is a flow chart showing an alternative signature protocol to simplify verification

The inclusion of i (and of m if necessary) is quite similar to replacing r by a compressed version of R consisting of the x coordinate and the first hit of the y coordinate. This alternative, of sending a compressed value of R instead of r, has the advantage of being somewhat simpler and not even a negligible chance of false recovery. Accordingly, as shown in FIG. 9, the signature is computed to provide a pair of components, r',s and forwarded with the message M to the recipient 14. The component r' is composed of the x co-ordinate of the point R and the first bit of the y co-ordinate. The component s is computed as before.

To verify the signature, the recipient 14 recovers the point R directly from the component r' and uses the verification equality equation $-zR+(zu \bmod n)G+wQ=O$ confirm it corresponds to the group identity. The transmission of the modified co-ordinate r' simplifies the verification but does increase the bandwidth required.

Figure 10:
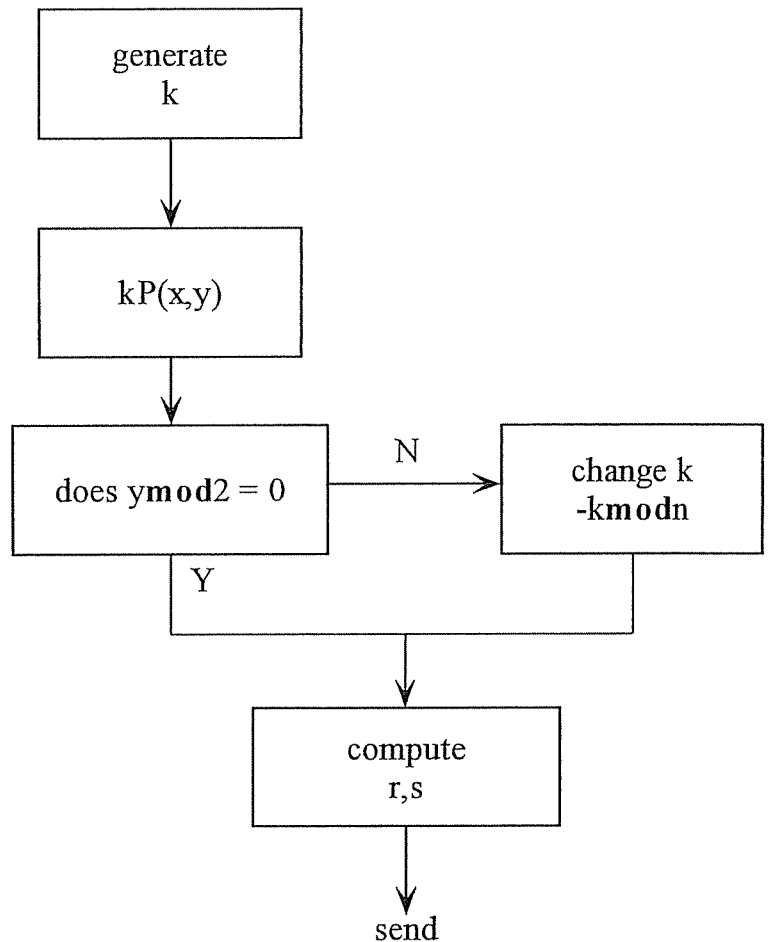
FIG. 10 is a flow chart showing an alternative technique performed by the signor to simply verification.

In some situations, no channel may be available for the signer to send extra bits. For example, existing standards may strictly limit both the signature format and the message format leaving no room for the sender to provide additional information. Signers and verifiers can nevertheless coordinate their implementations so that R is recoverable from r. This can be arranged by the signer, as shown in FIG. 10, by ensuring that the value of x conforms to prearranged criteria. In the notation above, the signer will compute R=kG=(x, y) as normal, and then in notation above compute i=y mod 2. If i=1, the signer will change k to -k mod n, so that R changes to -R=(x, -y) and i changes to 0. When the verifier receives the signature, the verifier presumes that i=0, and thus recovers the signature. The value of i is thus conveyed implicitly as the value 0, and the signer has almost negligible cost for arranging this. Similarly, in non-cyclic elliptic curves, the signer may try to transmit m implicitly, which to some extent has already been described. In the case of h=2, recall that the ¼ of the time, the verifier may need to verify two signatures. Instead of the verifier doing this extra work, the signer can detect this ¼ case, and try another value for k and R instead, repeating the process until one is found that conforms to the criteria. The verifier can determine which value of x to use without verifying two signatures.

As an alternative to modifying R as described above, and to maintain strict conformity to the ECDSA standard, the value of s may be modified after computation rather than R. In this case, the signer notes that the value of R does not conform to the prearranged criteria and proceeds to generate r and s as usual. After s is computed, the value is changed to (-s) to ensure the verification will be attained with the presumption of the prearranged value of y.

When a signer chooses a signature (r, s) such that R is implicitly recovered, an ordinary verifier will accept the signature as usual. Such signatures are perfectly valid. In other words, the revised verification is perfectly compatible with existing implementations of ECDSA verification. An accelerated verifier expecting an implicitly efficient signature but receiving a normally generated signature, will need to try two different values of i. If accelerated verification takes 60% of the time of a normal verify, then in a cyclic curve (cofactor h=1), the average time to needed verify a normal signature is 50% (60%)+50% (120%)=90% of a normal verify. This because 50% of the time a normal signature will have i=0, requiring just one implicitly accelerated verify, and the other 50% of the time, two accelerated verifies are needed. Thus an implicitly accelerated verify will still be faster than a normal verifier, even when the signatures are not implicitly accelerated.

Conventional signatures may also be modified, either by the signer or by a third party, to permit fast verification. In this case the signature is forwarded by a requestor to a third party who verifies the signature using the verification equality. In so doing the value of R is recovered. The signature is modified to include the indicator I and returned to the requestor. The modified signature may then be used in subsequent exchanges with recipients expecting fast verify signatures.

Figure 11:
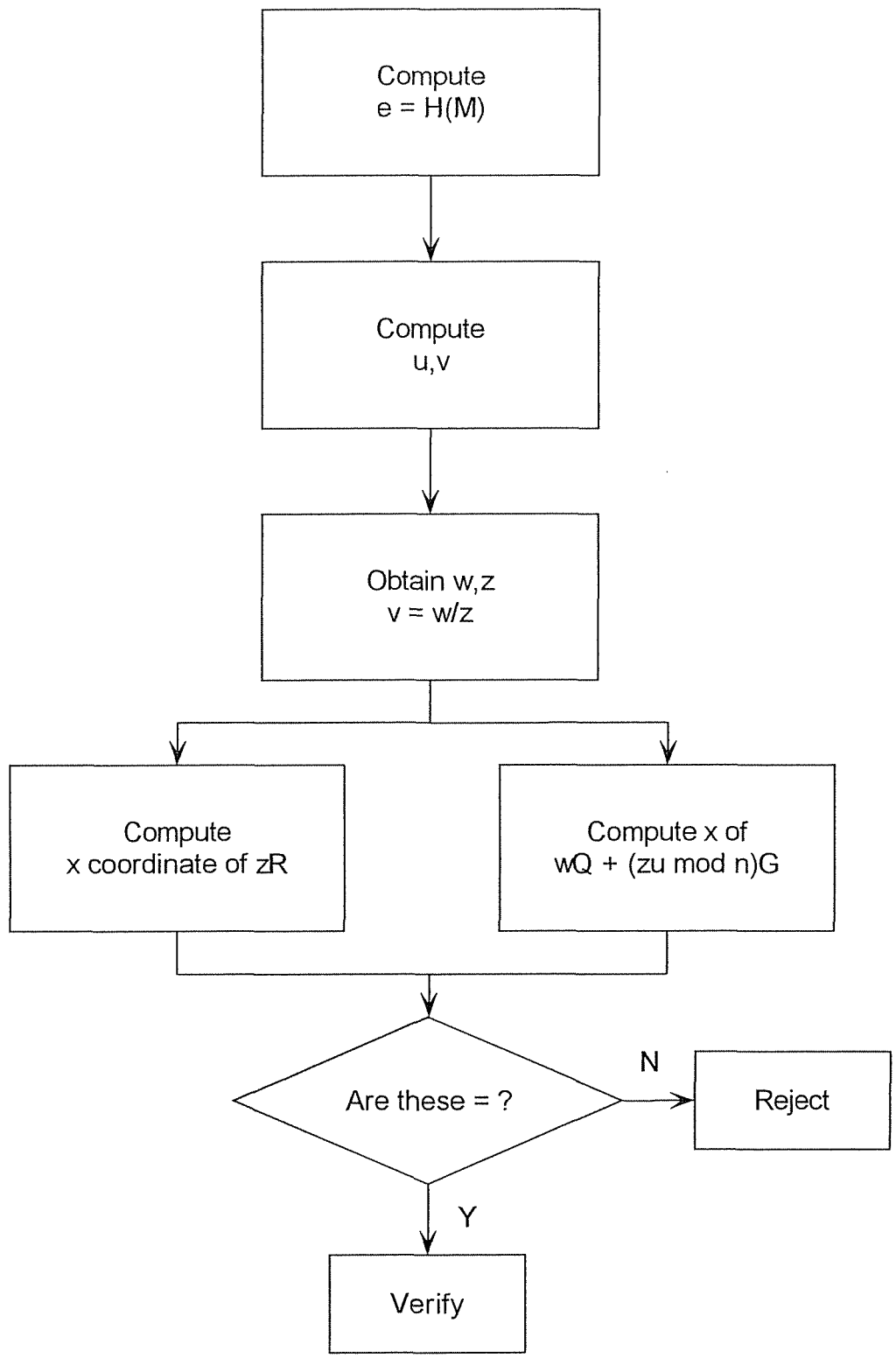
FIG. 11 is a flow chart showing an alternative verification ECDSA.

The above techniques recover R to permit a revised verification using the relationship $-zR+(zu \bmod n)G+wQ=O$. However, where the ECDSA is being verified, the integers w and z may be used without recovery of R as shown in FIG. 11. It is possible to compute the x coordinate of zR and the x' coordinate of the point wQ+(zu mod n)G, and then check the equality of these two x-coordinates. Only the x-coordinate of the point zR can be computed, as it is not possible to compute the y-coordinate zR directly without knowing the y-coordinate of R. However, there are several known methods to compute the x-coordinate of zR from the x-coordinate of R without needing the y coordinate of R. Such techniques include Montgomery's method set out on page 102 of the Guide to Elliptic Curve Cryptography identified above. It is then sufficient to check the x-coordinates of zR and wQ+(zu mod n)G, because equality of the x-coordinates means that wQ+(zu mod n)G equal zR or -zR, which means w/z Q+u G equals R or -R, which means uG+vQ has the same x-coordinate as R. This is the condition for successful ECDSA validation. One recovers the x-coordinate of R from the signature component r using the methods discussed above. The advantage of this approach is that it does not require extra work to recover the y-coordinate. A disadvantage, compared to the previous methods above, is that the zR has to be computed separately from wQ+(zu mod n) G meaning that some of the savings of the joint sum are not achieved.

Figure 12:
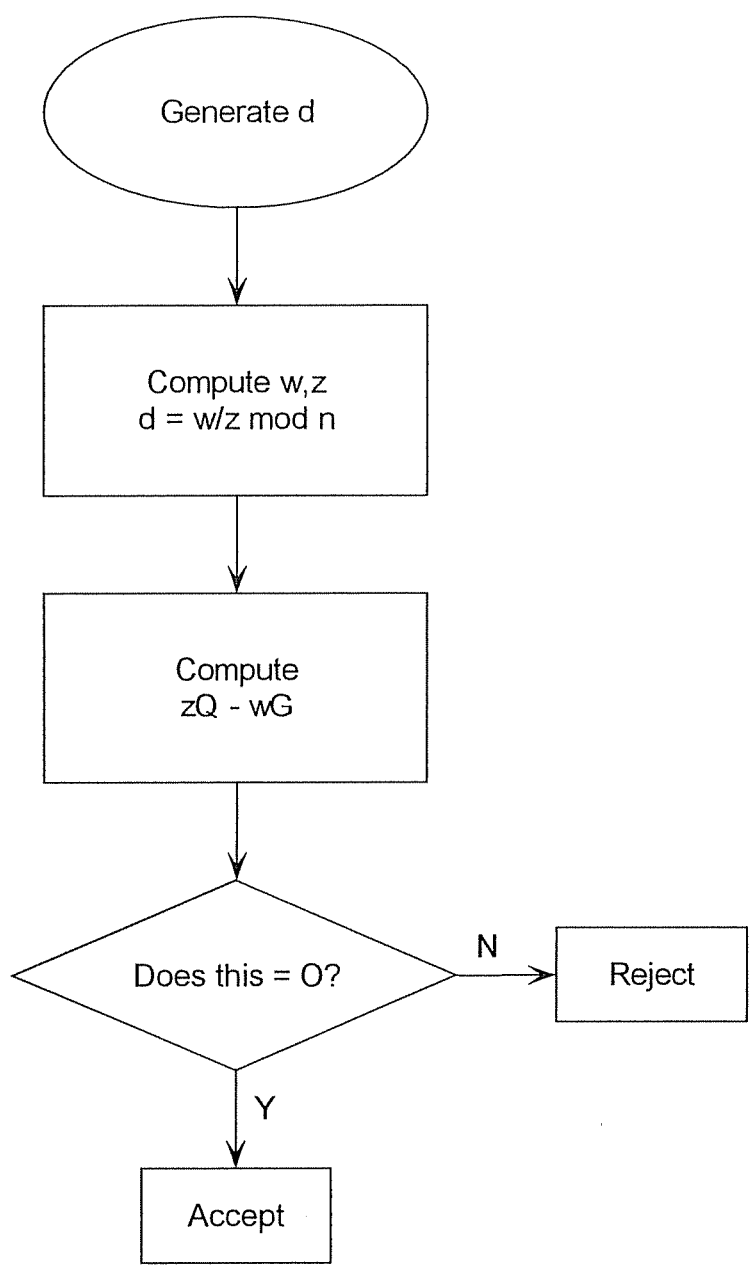
FIG. 12 is a flow chart showing point verification.

The above examples have verified a signature between a pair of correspondents 12, 14. The technique may also be used to verify an elliptic curve key pair (d, Q) as shown in FIG. 12. To verify the key pair means to check that Q=dG. This may be important when the key pair is provided by a third party under secure conditions to ensure no tampering has occurred. If t is the bit length of d, then computing dG with the binary method take (3t/2) operations on average. In the present embodiment, one of the correspondents, 12, 14 generates a random integer d and obtains a pair of integers w, z such that d=w/z mod n. Typically the integers w, z are each of half the of length d. Then the correspondent computes zQ−wG, and checks that the result is the group identify 0. Computing zQ−wG takes t operations on average so a saving of 50% is obtained. This has the most advantage in environments where storing a pre-computed multiple of G is too expensive. As an alternative where limited memory is available, given a pre-computed multiple H=uG, then dG can be computed as d' G+d" H, where d=d'+d"u mod n, with roughly the same cost as above.

Another application is implicit certificate verification. Implicit certificates are pairs (P, I), where P is an elliptic curve point and I is some identity string. An entity Bob obtains an implicit certificate from a CA by sending a request value R which is an elliptic curve point to the CA. The CA returns the implicit certificate (P, I) and in addition a private key reconstruction data value s. Bob can use s to calculate his private key. More generally, any entity can use s to verify that the implicit certificate correctly corresponds to Bob's request value R and the CA public key C. This is done by checking the verification equality H(P, I)R+sG=H(P,I) P+C, where H is a hash function. This equation is equivalent to eQ+sG=C, where e=H(P, I) and Q=R−P. The form of this equation is highly similar to the form of the standard ECDSA verification equation. Consequently, the techniques discussed above may be used to provide a means to accelerate verification of this equation. This is done optimally by determining relatively smaller values w and z such that e=w/z mod n, then multiplying the equation through by z to give: wQ+(sz mod n)G−zC=O. Again, the multiple of G is this equation is full size, but generally multiples of G can be pre-computed, so this does not represent a problem.

Another variant that takes advantage of this technique is to shorten all three multiples in the ECDSA signing equation. Theoretically, each multiple can be shortened to a length which is ⅔ the length of n (where n is the order of G). One way to achieve this shortening is by solving the short vector lattice problem in dimensions. Algorithms exist for solving such problems. Shortening all three multiples is most useful when no pre-computed multiples of G can be stored, which makes it more efficient to reduce the length of the multiple of G as much as possible. Such techniques are described more fully in Henri Cohen, "A Course in Computational Algebraic Number Theory", Springer, ISBN 0-387-55640-0. Sections 2.6 and 2.6 describe the LLL algorithm, its application to finding short vectors in lattices, and also mentions Vallee's special algorithm for 3 dimensional lattices.

Another application of this technique is the application to a modified version of the Elliptic Curve Pintsov-Vanstone Signature (ECPVS) scheme with partial message recovery. A signature based on the ECPVS scheme can be represented by (r, s, t). Verification of a signature and message recovery from a signature under public Q, with base generator G, is done as follows. The verifier computes e=H(r||t), where H is a hash function. The verifier then computes R=sG+eQ. Next, the verifier derives a symmetric encryption key K from R. With this, the verifier decrypts r using K to obtain a recovered message part u. The recovered message is some combination oft and u. The signature is valid only if u contains some redundancy, which is checked by verifying that u conforms to some pre-determined format. The ECPVS scheme is part of draft standards IEEE P1363a and ANSI X9.92.

Figure 13:
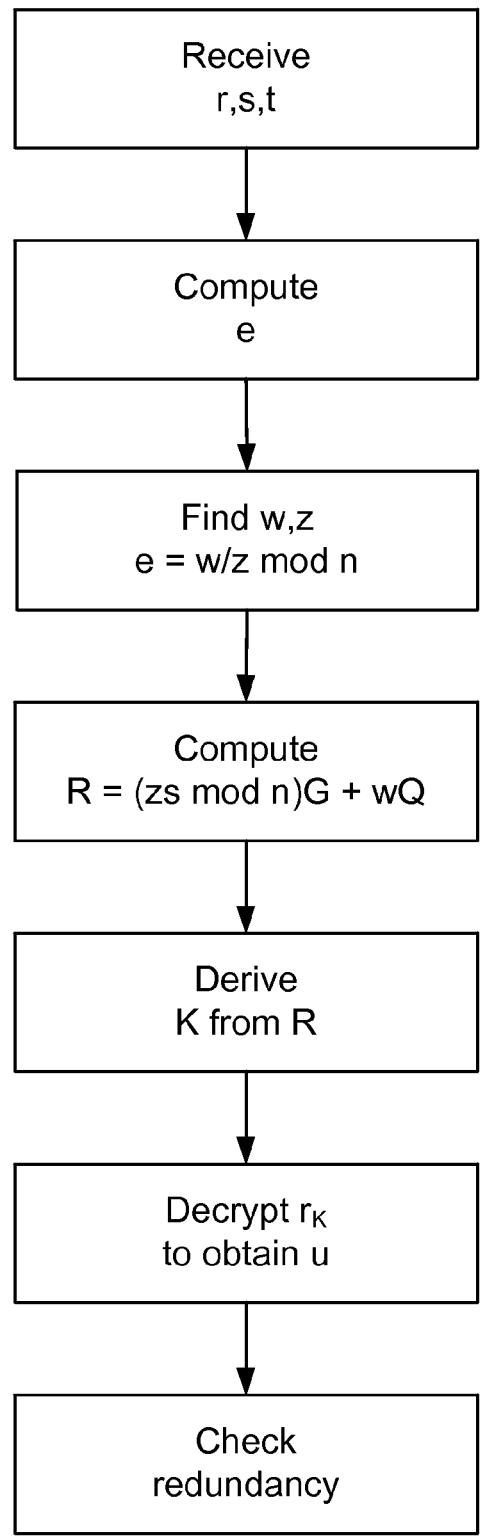
FIG. 13 is a flow chart showing a modified Elliptic Curve Pintsov-Vanstone Signature verification protocol.

In a modified variant of ECPVS, verification time can be decreased by utilizing integers w and z. The modified variant of ECPVS is shown in FIG. 13 and proceeds as follows. After computing e as usual, the verifier then finds w and z are length half that of n such that e=w/z mod n, where n is the order of the point G. The verifier then computes R=(zs mod n)G+wQ, and proceeds as before, so deriving a key from R and then decrypting r with the key, and then verifying that the decryption has the correct form. This form of verification is more efficient because the multiple of Q is smaller.

A method to further accelerate signature verification of digital signature, in elliptic curve groups and similar groups is illustrated as follows. The verification of an ECDSA signature is essentially equivalent to confirmation that a linear combination, such as aR+bQ+cG, of three elliptic curve points, equals the point of infinity. One way to verify this condition is to compute the point aR+bQ+cG and then check if the result is the point O at infinity, which is the identity element of the group as described above. This verification can sometimes be done more quickly than by directly computing the entire sum. For example, if a=b=c, then aR+bQ+cG=O if and only if the points R, Q and G are collinear. Checking if points are collinear is considerably faster than adding to elliptic curve points. Collinearity can be checked with just two field multiplication, by the equation $(x_R-x_G)(y_Q-y_G)-(x_Q-x_G)(y_R-y_G)=O$. Adding points requires at least two field multiplication, a field squaring and a field inversion, which is generally equivalent to about 8 field multiplication. When a=b=c, verification is thus possible in about 18% of the time taken by adding the points. As such, this technique may be used as a preliminary step of the verification process where the likelihood of these conditions existing is present. Similarly, when b=c=0, so that one wishes to verify that aR=O, in principle one does not need to compute aR in its entirety. Instead one could evaluate the $a^{th}$ division polynomial at the point R. The division polynomial essentially corresponds to a recursive formula for the denominators of coordinates the point aR, when expressed as rational functions of the coordinates of the point R. It is known that aR=O if and only if the denominator is zero. Furthermore, when b=c=O and the elliptic curve group is cyclic of prime order n, it is known that aR=O only if a=O mod n or if R=O. This verification is comparably instantaneous, in that zero elliptic curve point operations are needed. When the cofactor is small, such as h=2 or h=4, point operations can replaced by a few very fast field operations. Thus special cases of verification that a sum points is zero can be done very quickly.

Recursive formula exist, similar to the recursive formulae for division polynomials, for the denominators of sums like aR+bQ+cG, and these can be compute more quickly than the computing the full value of the point aR+bQ+cG. Knowledge of the group order n can further improve verification time.

Figure 14:
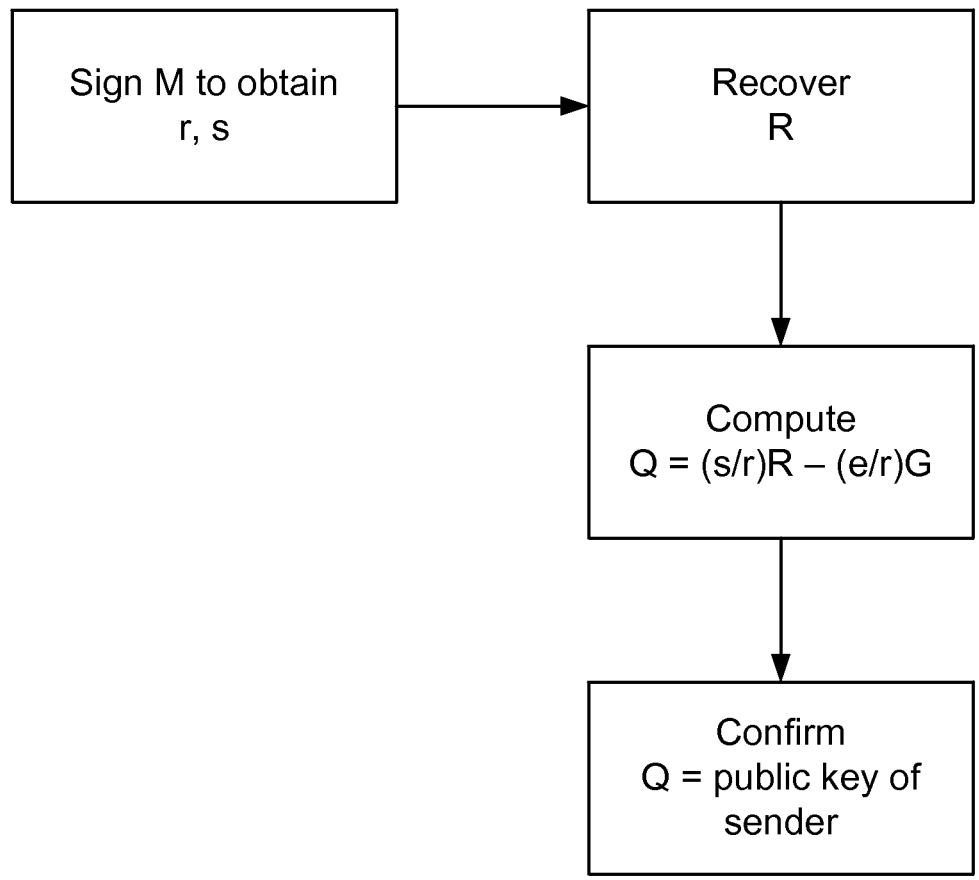
FIG. 14 shows a method of recovering a public key from an ECDSA signature.

Yet another application of this technique is to provide efficient recovery of the public key Q from only the ECDSA digital signature as shown in FIG. 14. Suppose that one correspondent 12 signs a message M with signature (r, s) and wishes to send the signed message to the correspondent 14. Normally correspondent 14 will send M and (r, s) to the correspondent, and will also often send the public key Q. If correspondent 12 did not send her public key, then normally correspondent 14 will look up her public key up in some database, which could stored locally or remotely via some network. To avoid this, it would be beneficial to be able to recover the public key Q from the signature. Given an ordinary ECDSA signature (r, s), one can recover several candidate points Q that could potentially be the public key. The first step is recover the point R. Several methods have already been described for finding R in the context of accelerated verification, such as: by inclusion of extra information with the signature; by inclusion of extra information in the message signed; by extra work on the signer's part to ensure one valid R can correspond to r; and by extra work on the verifier's part of trying a multiplicity of different R values corresponding to r. Once R is recovered by one of these methods, then the public key Q can be recovered as follows. The standard ECDSA verification equation is $R=(e/s)G+(r/s)Q$, where $e=H(M)$ is the hash of the message. Given R and this equation, solving for Q is done by $Q=(s/r)R-(e/r)G$.

However, since with a significant probability a pair (r, s) will yield some valid public key, the correspondent 14 needs a way to check that Q is correspondent's 12 public key. Correspondent 12 can make available to correspondent 14 the signature, such as another ECDSA signature (r', s'), from a CA on correspondent 14 public key. Correspondent 12 can send the CA signature, (r', s'), to correspondent 14, or correspondent 14 can look it up in some database. The CA's signature will be on correspondent's 12 name and her public key Q. Correspondent 14 will use the CA's certificate to verify the message which corresponds to the public key Q. If the signature verifies then the correspondent 14 has recovered the correct value for the public key Q. Omitting the public key from the certificate can save on bandwidth and storage and the verification process described above yields reduced verification times.

Correspondent 14 could also verify that Q is correspondent's 12 public key by checking Q against some more compact value derived from Q, such as the half of the bits of Q. The compact version of Q could then stored or communicated instead of Q, again savings on storage and bandwidth.

H will also be appreciated that each of the values used in the verification equality are public values. Accordingly, where limited computing power is available at the verifier it is possible for the signer to compute the values of w and z and forward them with R as part of the message. The recipient then does not need to recover R or compute w and z but can perform the verification with the information available. The verification is accelerated but the bandwidth increased.

Although the descriptions above were for elliptic curve groups, many of the methods described in the present invention applies more generally to any group used in cryptography, and furthermore to any other application that uses exponentiation of group elements. For example, the present invention may be used when the group is a genus 2 hyperelliptic curve, which have recently been proposed as an alternative to elliptic curve groups. The above techniques may also be used to accelerate the verification of the Digital Signature Algorithm (DSA), which is an analogue of the ECDSA. Like ECDSA, a DSA signature consists of a pair of integers (r, s), and r is obtained from an element R of the DSA group. The DSA group is defined to be a subgroup of the multiplicative group of finite field. Unlike ECDSA, however, recovery of R from r is not easy to achieve, even with the help of a few additional bits. Therefore, the present technique applies most easily to DSA if the value is R sent with as part of the signed message, or as additional part of the signature, or as a replacement for the value r. Typically, the integer r is represented with 20 bytes, but the value R is represented with 128 bytes. As a result, the combined signature and message length is about 108 bytes longer. This could be a small price to pay to accelerate verification by 33%, however.

In the DSA setup, p is a large prime, and q is smaller prime and q is a divisor of (p−1). An integer g is chosen such that $g^q=1 \mod p$, and $1 \leq g \leq p$. (Note that q and g correspond to n and G, respectively, from ECDSA.)

The private key of the signer is some integer x and the public key is $Y=g^x \mod p$.

The signer generates a signature in the form (R,$) instead of the usual (r, s). Here, $R=g^k \mod p$, whereas, $r=R \mod q$. In both cases, $s=k^{-1}(h(M)+x\,r) \mod q$, where x is the private key of the signer, M is the message being signed, and h is the hash function being used to digest the message (as in ECDSA).

In normal DSA, the verifier verifies signature (r, s) by computing $u=h(M)/s \mod q$ and $v=r/s \mod q$, much like the u and v in ECDSA embodiments, and then checks that $$r=(g^u Y^v \mod p) \mod q.$$

In this embodiment, the verifier finds w and z of bit length about half that of q, so that each of w and z is approximately sqrt(q), such that $v=w/z \mod q$. This is done by the same method as in ECDSA embodiment above, with n replaced by q. The verifier then computes:

$$R^z g^{(zu \mod q)} Y^w \mod p.$$

If this quantity equals 1, then verifier accepts the signature, otherwise the signature is rejected.

The verifier computes this quantity using the square-and-multiply algorithm, or some variants thereof, and exploits simultaneous squaring, which is analogous to simultaneous doubling in ECDSA. Many of the methods of ECDSA fast verify may be used for DSA fast verify. A pre-computed multiple of the g, say j, may be used, so that the computation looks like:

$$R^z g^s j^t Y^w \mod p$$

where each of z, s, t and w has bit length about half that of q. If pre-computed powers of the public Y are made available, then the lengths of the exponents can be further reduced, thereby further reducing the number of doublings, making the verification yet faster.

The verification of an ECC signature, such as an ECPVS, sometimes involves the computation of multiple point multiplications. For example, verification of an ECPV signature can include the computation of a key $Q'=sG+eG_A$, where s is a purported signature component, e is a value derived from publicly available information, G is a fixed generating point of the cyclic group G of prime order n, and $G_A$ is the signer's public key. The key Q' is then subsequently used for performing additional cryptographic operations, e.g. extraction of plaintext from ciphertext, redundancy tests, etc. The computational cost associated with signature verifications of this type is dominated by the computation of the point multiples, e.g. in computing $Q'=sG+eG_A$, since s and e are "full-sized" integers.

A signature based on the ECPVS scheme can be represented by (c, s, V). Verification of a signature and message recovery from a signature under public Q, with base generator G, is done as follows. The verifier computes $e=Hash(c\|V)$, where Hash is a hash function. The verifier then computes $Q'=sG+eG_A$. Next, the verifier derives a symmetric encryption key from Q'. With this, the verifier decrypts c using the encryption key to obtain a recovered message part N. The complete recovered message is some combination of V and N. The signature is valid, for example, if N has a particular characteristic such as containing some redundancy, which is checked by verifying that N conforms to some pre-determined format.

It has been recognized that when the verification of an ECPVS digital signature requires computing multiple point multiplications, although one of the point multiplications can often be accelerated using various techniques, the other point multiplication cannot be accelerated. To speed up the computation of such other point multiplications, it has been found that the integer can be made smaller and, if necessary, the signature scheme modified to accommodate the reduction in size of the integer. As will be discussed below, in one embodiment, the integer can be split into two or more portions and the signature scheme modified accordingly.

Figure 15:
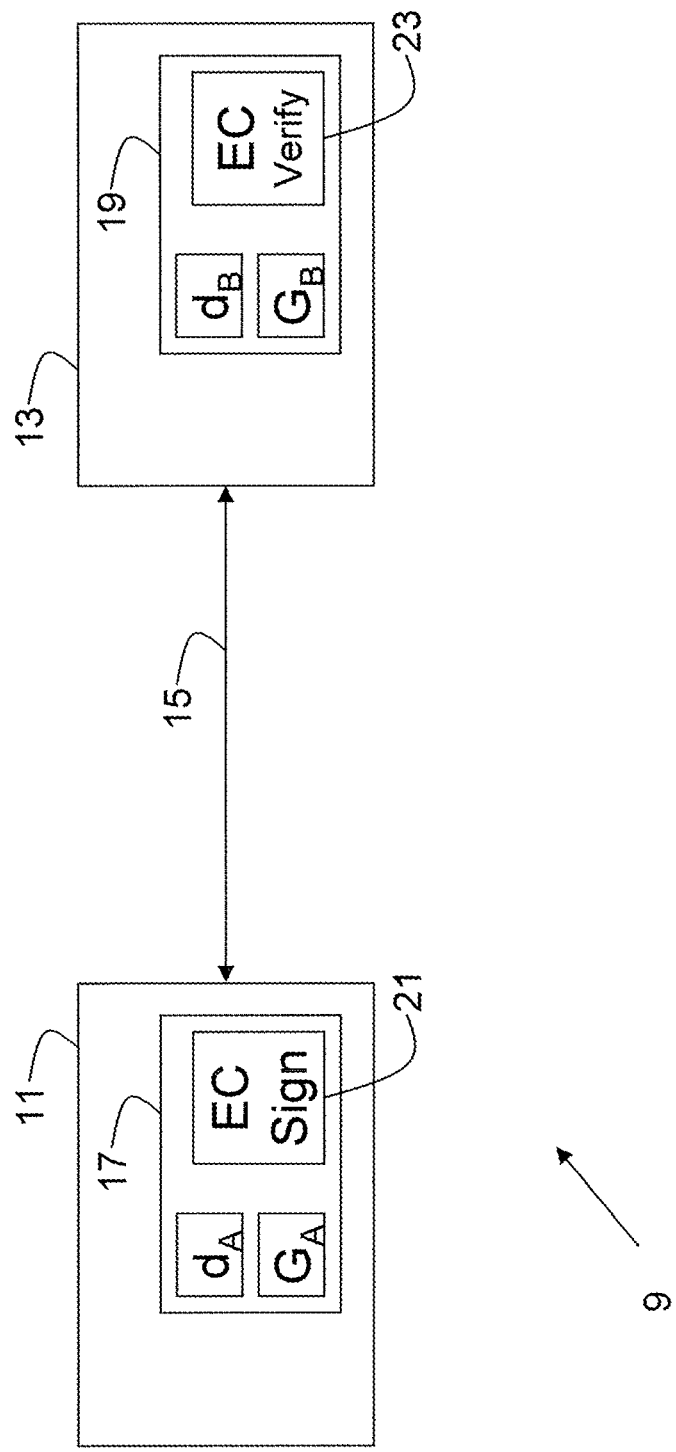
FIG. 15 shows an example of a data communication system.

FIG. 15 shows an example of a data communication system. The system 9 in this example comprises a first correspondent 11 connectable to a second correspondent 13 over a network communication link 15. It will be appreciated that the network communication link 15 may form part of any wired or wireless network or may even represent a connection between different modules of the same physical electronic device. Each correspondent 11, 13 may act as a sender or receiver and may also act is a signer when generating digital signatures or as a verifier when verifying such digital signatures. For the purpose of this illustration, the following description will designate the first correspondent 11 as the signer and the second correspondent 13 as the verifier. Each correspondent 11, 13 has a respective cryptographic unit 17, 19, embodied in hardware, software, or a combination of the two. Each correspondent 11, 13 may also comprise internal or external memory or other computer readable media for storing computer executable instructions for enabling the cryptographic unit 17, 19 to perform cryptographic operations as is known in the art.

It can be seen in FIG. 15 that the correspondents 11, 13 are, in this example, part of a public key cryptographic system and thus each have private-public long-term key pairs ($d_A$, $G_A$) and ($d_B$, $G_B$) respectively. The private keys $d_A$, $d_B$ are stored in a secure manner so as to protect the respective keys from being compromised.

The cryptographic unit 17 of the signer 11 can be configured or otherwise programmed to perform various EC signing routines such as ECPVS and the verifier 13 can be configured or otherwise programmed to perform various complementary EC verification routines. In this example, the signer 11 thus comprises an EC signing module 21 and the verifier 13 thus comprises an EC verification module 23. It will be appreciated that the signer 11 and verifier 13 may also be capable of both signing and verifying messages and therefore may instead have a more comprehensive EC crypto module (not shown) which is capable of performing various EC operations. In the following, signer A can be interchangeable with correspondent 11 and verifier B can be interchangeable with correspondent 13.

Although the principles discussed herein are applicable to any computing device (as shown in FIGS. 1 and 14), for the purpose of illustration, the embodiments described below may relate to a mobile wireless communication device (mobile device hereinafter for brevity) acting as either correspondent 11, 13, which device can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device can be a two-way communication device with advanced data communication capabilities including the capability to communicate with other mobile devices 100 or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 16:
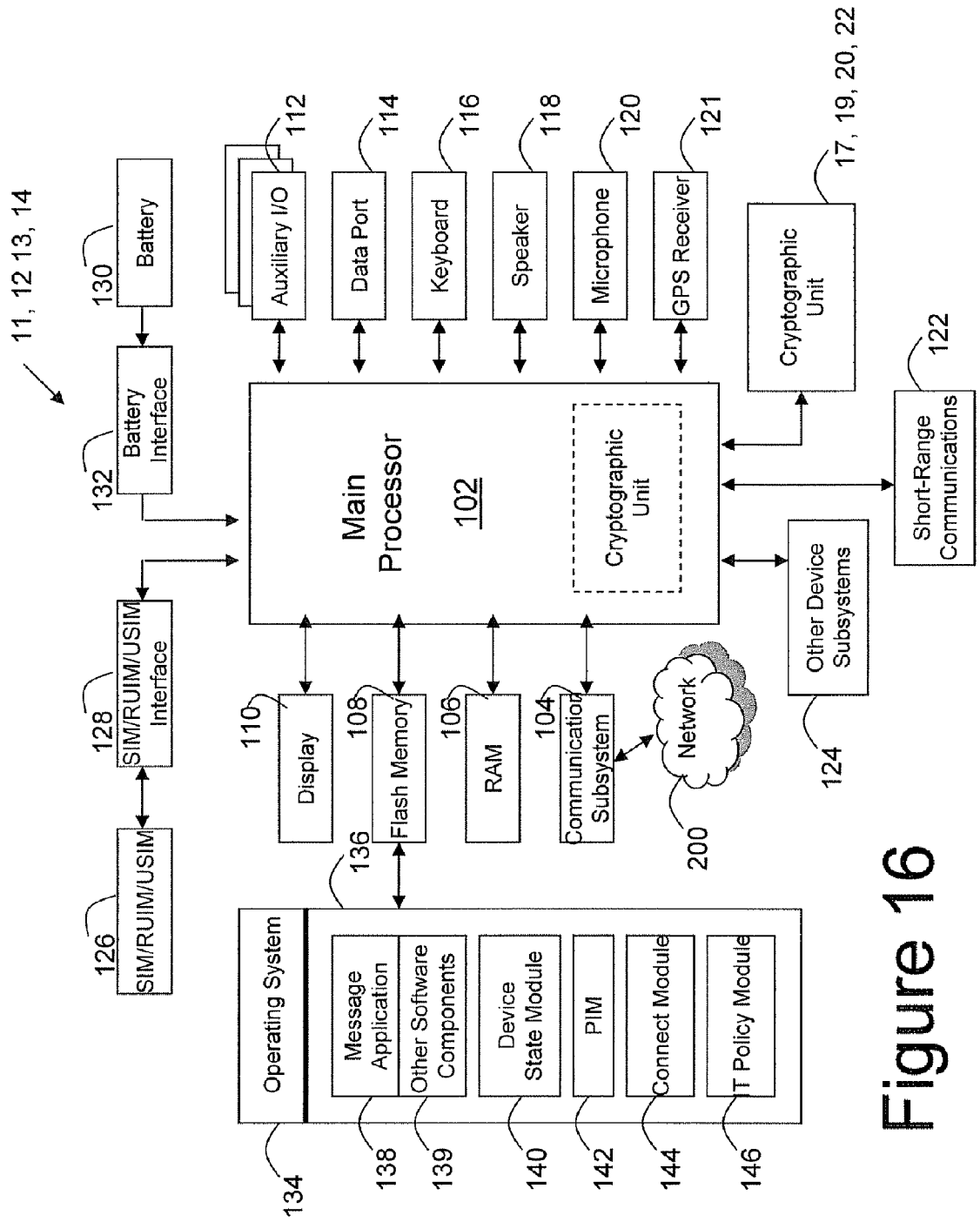
FIG. 16 is a block diagram of an example embodiment of a mobile device.

An example configuration for the mobile device is illustrated in FIG. 16. FIG. 16 illustrates a block diagram of an example embodiment of a mobile device. The mobile device includes processor electronics, such as a main processor 102. The main processor 102 can be configured to perform one or more operations described herein. In some implementations, processor electronics includes one or more processors (e.g., single-core processor, multi-core processor, or multi-threaded processor), one or more specialized logic circuits, or both. Communication functions, including data and voice communications, are performed through a communication subsystem 104. The communication subsystem 104 receives messages from and sends messages to a wireless network 200. In this example embodiment of the mobile device, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device is a GSM/GPRS wireless network in one example implementation, other wireless networks may also be associated with the mobile device in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems. The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device can send and receive communication signals over the wireless network 200 after required network registration or activation procedures have been completed. Network access is associated with a subscriber or user of the mobile device. To identify a subscriber, the mobile device requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device and to personalize the mobile device, among other things. Without the SIM card 126, the mobile device is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device. Although current technology makes use of a battery, future technologies such as micro fuel cells may provide the power to the mobile device.

The mobile device also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device during its manufacture. Other software applications include a message application 138 that can be any suitable software program that allows a user of the mobile device to send and receive electronic messages. In addition to the message application 138, the software applications 136 may also comprise various other software components 139, some of which will be describe in greater detail below. Various alternatives exist for the message application 138 as is well known to those skilled in the art. Messages that have been sent or received by the user are typically stored in the flash memory 108 of the mobile device or some other suitable storage element in the mobile device. In at least some embodiments, some of the sent and received messages may be stored remotely from the device 100 such as in a data store of an associated host system that the mobile device communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device with respect to such items. This can be particularly advantageous when the host computer system is the mobile device subscriber's office computer system.

The mobile device also includes a connect module 144, and an IT policy module 146. The connect module 144 implements the communication protocols that are required for the mobile device to communicate with the wireless infrastructure and any host system, such as an enterprise system, that the mobile device is authorized to interface with. The connect module 144 includes a set of APIs that can be integrated with the mobile device to allow the mobile device to use any number of services associated with the enterprise system. The connect module 144 allows the mobile device to establish an end-to-end secure, authenticated communication pipe with the host system. A subset of applications for which access is provided by the connect module 144 can be used to pass IT policy commands from the host system to the mobile device. This can be done in a wireless or wired manner. These instructions can then be passed to the IT policy module 146 to modify the configuration of the device. Alternatively, in some cases, the IT policy update can also be done over a wired connection.

The IT policy module 146 receives IT policy data that encodes the IT policy. The IT policy module 146 then ensures that the IT policy data is authenticated by the mobile device. The IT policy data can then be stored in the flash memory 106 in its native form. After the IT policy data is stored, a global notification can be sent by the IT policy module 146 to all of the applications residing on the mobile device. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data. All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device. These software applications can be third party applications, which are added after the manufacture of the mobile device. Examples of third party applications include games, calculators, utilities, etc.

The additional applications can be loaded onto the mobile device through at least one of the wireless network 200, the auxiliary I/O subsystem 112, the data port 114, the short-range communications subsystem 122, or any other suitable device subsystem 124. This flexibility in application installation increases the functionality of the mobile device and may provide enhanced on-device functions, communication-related functions, or both. For example, secure communication applications may enable electronic commerce functions and other such financial transactions to be performed using the mobile device.

The data port 114 enables a subscriber to set preferences through an external device or software application and extends the capabilities of the mobile device by providing for information or software downloads to the mobile device other than through a wireless communication network. The alternate download path may, for example, be used to load an encryption key onto the mobile device through a direct and thus reliable and trusted connection to provide secure device communication.

The data port 114 can be any suitable port that enables data communication between the mobile device and another computing device. The data port 114 can be a serial or a parallel port. In some instances, the data port 114 can be a USB port that includes data lines for data transfer and a supply line that can provide a charging current to charge the battery 130 of the mobile device.

The short-range communications subsystem 122 provides for communication between the mobile device and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device is substantially similar, except that the received signals are output to the speaker 118, and signals for transmission are generated by the microphone 120. Alternative voice or audio I/O subsystems, such as a voice message recording subsystem, can also be implemented on the mobile device. Although voice or audio signal output is accomplished primarily through the speaker 118, the display 110 can also be used to provide additional information such as the identity of a calling party, duration of a voice call, or other voice call related information.

As can be seen in FIG. 16, the cryptographic unit 17, 19, 20, 22 may be independent of the main processor 102 in a mobile device configuration, or may be implemented by special instructions or hardware associated with the main processor 102 itself Correspondents 11, 12, 13, 14 can include one or more computer storage media.

Figure 17:
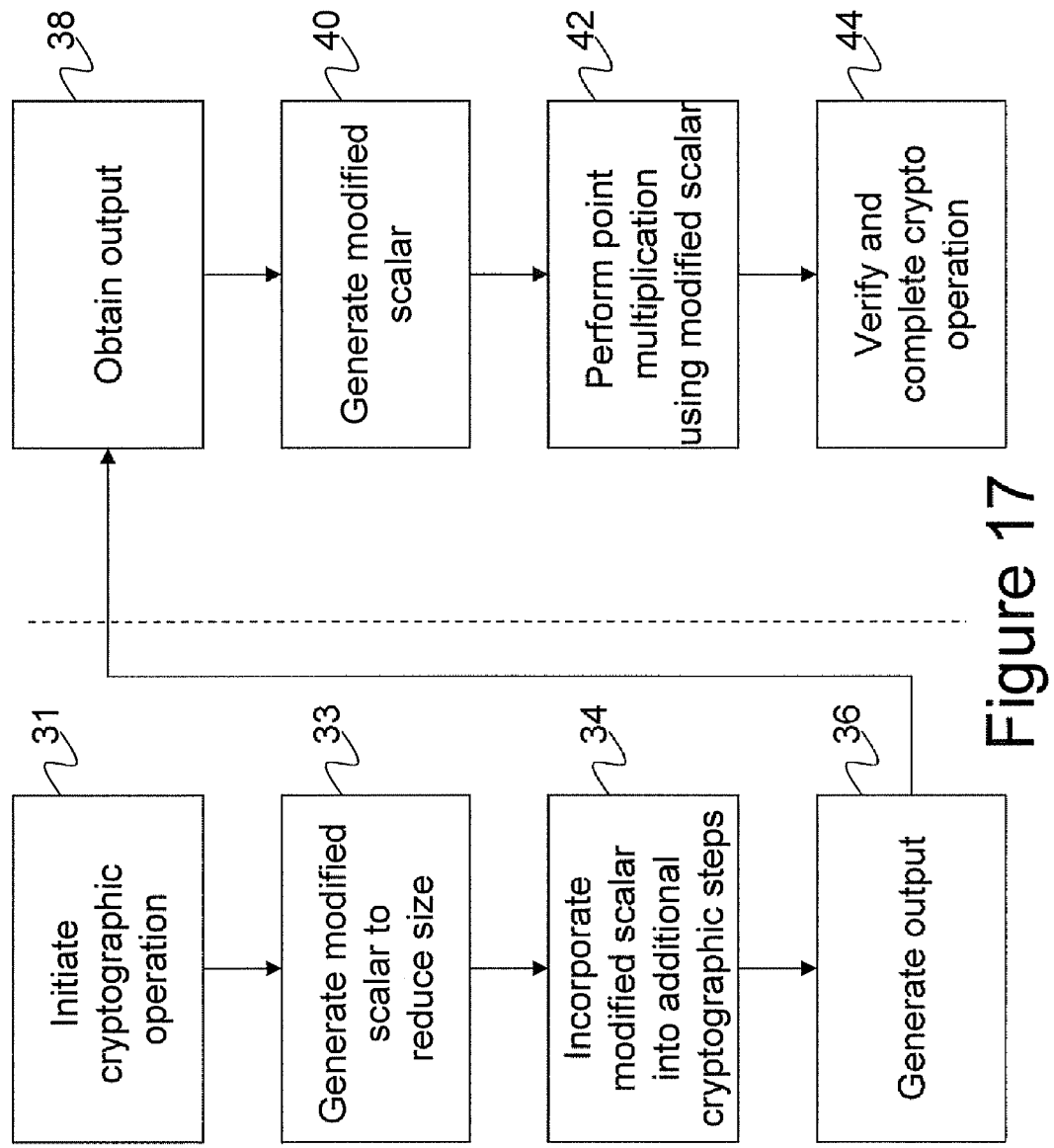
FIG. 17 is a flow chart illustrating computer executable instructions used in performing an example cryptographic operation comprising multiple point multiplication.

Turning now to FIG. 17, a set of operations to speed up the computation of a point multiplication, e.g. during signature verification, is shown. In this example, a cryptographic operation performed at one correspondent 11, 13 is modified to take into consideration modifications to a complementary cryptographic operation performed by another correspondent 11, 13, that requires one or more point multiplications. At 31, the cryptographic operation is initiated and at 33 a modified scalar is generated to reduce its size. The modified scalar is then incorporated into additional cryptographic steps at 34 such that an output is generated at 36. The modification performed at 32 enables the modified scalar, being of a reduced size, to be used in a point multiplication to speed up a complementary cryptographic operation. At 38 the output generated at 36 is obtained and the modified scalar is generated at 40, e.g. according to a predefined function. The point multiplication, e.g. a multiple point multiplication operation, is then performed at 42 and the complementary cryptographic operation is completed at 44.

As discussed above, the principles described herein are particularly suitable to signature schemes that require the computation of point multiples, e.g. multiple point multiplications required during verification of a signature. The following example illustrates the incorporation of a modified scalar into the ECPVS signature generation and signature verification procedures.

The ECPVS scheme, in the context of the example shown in FIG. 15, begins with a signer A having a private-public long-term key pair $(d_A, G_A)$ based on an elliptic curve with a base point G, where $d_A$ is a long-term private key and $G_A$ is a long-term public key, where $G_A$ is shared amongst a group of verifiers. In the signing algorithm, signer A signs a message $M=N\|V$, where N is the hidden portion of the message to be signed. The hidden portion has a predefined characteristic (such as a particular format), e.g. by containing a certain level of redundancy, and V is the plaintext portion of the message. In the ECPVS scheme, the amount of redundancy or other characteristic is specified and thus upon recovering the hidden portion N when verifying the signature, the redundancy or other characteristic can be checked to verify the signature. The following summarizes the signing operations performed in generating an ECPV signature.

1. Generate an ephemeral key pair (k, Q), where Q=kG is a point on the elliptic curve, and k is a random integer $1 \leq k < n$, and n is the order of the group generated by the elliptic curve base point G.
2. Construct a key $k_1$=KDF(Q), where KDF is a key derivation function. In general, a key derivation function is used to derive a secret key from a secret value and/or some known information. In ECPVS, the KDF takes as an input a point, Q, and possibly other information, and generates an encryption key $k_1$. In some implementations, a KDF uses a hash function.
3. Compute a first signature component c as c=ENC ($k_1$,N), i.e. the encryption of the message N using a key $k_1$, where ENC is an encryption scheme that takes as an input plaintext (e.g. AO and encrypts it with a key $k_1$ to produce ciphertext c. For example, ENC can be based on a symmetric-key encryption technique such as Advanced Encryption Standard (AES).
4. Compute an intermediate component h as h=Hash(c∥V), where Hash is a suitable hash function, e.g. SHA1. If preferred, additional information that may be available or become available to parties verifying the signature (in other words information that the verifier needs 'on the side' for verification), e.g. a certificate or identifying information of the signer may be incorporated into h.
5. Convert the intermediate component h to an integer e.
6. Calculate a second signature component s using a suitable signature algorithm, such as the Schnorr algorithm, where: s=k−e·$d_A$ (mod n).
7. Output the signature as (c, s, V) or (s, c∥V).

The cryptographic unit 19 of the verifier 13 can be configured or otherwise programmed to perform various complementary EC verification routines, such as for verifying an ECPVS signature generated by the signer 11. The following summarizes the verification operations performed in verifying an ECPVS signature, e.g. on a signature (s, c∥V), when provided with A's genuine public key $G_A$.

1. Compute the intermediate component h, using the component c∥V and using the same hash function used in the signing stage and any additional information, such as the identification information of the signer, where: h=Hash (c∥V).
2. Convert h to an integer e.
3. Compute a representation Q' of the ephemeral public key Q using the integer e, the public key of A, the base point G, and the signature component s, e.g. as Q'=sG+e$G_A$.
4. Compute a decryption key $k_1$ using the same key derivation function KDF used in the signing stage, including the same additional information, namely as $\hat{k}_1$=KDF (Q').
5. Recover a representation N' of the hidden portion N by decrypting the component c using the key derived in step 4 and a complementary decryption function DEC, namely as N'=DEC($\hat{k}_1$,c).
6. Check the specified characteristic (such as a particular format) of, e.g., redundancy contained in N'. If N' contains the necessary characteristic such as a certain amount of redundancy, then N' is a valid message and the signature is verified. If N' does not contain the necessary redundancy, then a null and invalid signature is returned (i.e. the signature is rejected).

As discussed above, during verification, the step Q'=sG+e$G_A$ typically dominates the computation time and thus to speed up verification or to otherwise reduce the burden on the verifier 13, techniques should be applied at this step. For the first point multiple sG, tables of pre-computed values can be generated to assist in speeding up this portion of the operation. Such pre-computed tables can be generated since G in this case is a system-wide parameter and can be considered "fixed". Therefore, a point multiplication can be accelerated by pre-computing some data that depends solely on the fixed point G and storing this for subsequent use. Further detail of an example acceleration technique can be found in the academic paper: "Accelerated Verification of ECDSA Signatures"; authored by Adrian Antipa, Daniel Brown, Robert Gallant, Rob Lambert, Rene Struik, and Scott Vanstone; and presented at SAC 2005. It has been found that the second point multiple e$G_A$ cannot be accelerated in the same way as sG because $G_A$ is not a fixed point, it is different for each signer 11. Therefore, in order to reduce the burden imposed by this computation, the following will provide a technique to make e smaller.

In the following embodiment, e is made smaller by transforming the value for e, computed at the time of signing, into a plurality of smaller values, in this example two values $e_1$ and $e_2$, and modifying the signing routine to accommodate for this. As a result, the verification routine can be modified such that computation of the key Q', which involves the computation of two point multiples is modified as: Q'=(s$e_2$ mod n)G+$e_1 G_A$. It can be seen that the transformation of e into $e_1$ and $e_2$ and the modification of the signing equation, which will be explained below, results in a smaller integer required to be multiplied by the public key $G_A$. For example, $e_1$ and $e_2$ can have approximately half the bit length of n and are deterministically derived from the publicly computable parameter e as used in the original ECPVS scheme.

If the key Q' is computed using the modified equation given above, significant cost savings can be achieved in computing the scalar multiple of $G_A$, since the cost of this computation is proportional to the bit-size of the scalar multiple involved, for example, where $e_1$ is half the size of e. Since G is a fixed point, computations of scalar multiples of G can be accelerated using other methods such as the generation of pre-computed tables of point multiples, as noted above. It will be appreciated that the relative cost of computing the key Q' via the modified equation versus the original equation depends on implementation details but it can be expected that efficiency improvements of 35% to 70% are possible. For devices with limited processing capability or where verification is beneficially faster, such improvements can be a significant advantage.

An example signature scheme that utilizes the modification described above is now described in the setting of a general cyclic group. First, the system parameters may be defined as follows. Let G be a cyclic group of prime order n with generator G and identity element O. ENC(k, x) represents an encryption function with key space K and has a corresponding decryption function or "inverse" DEC(k, x). A suitable key derivation function (KDF) is then defined as f:G→K. A suitable parameter extraction function may then be defined as ϕ: Zn→Zn×Zn. A suitable hash function is defined as H: $\{0,1\}^*$→Zn and M ⊂ $\{0,1\}^*$ is a set with sufficient redundancy, e.g. t bits. Here, $\{0,1\}^*$ denotes the set of binary strings of any length.

Figure 18:
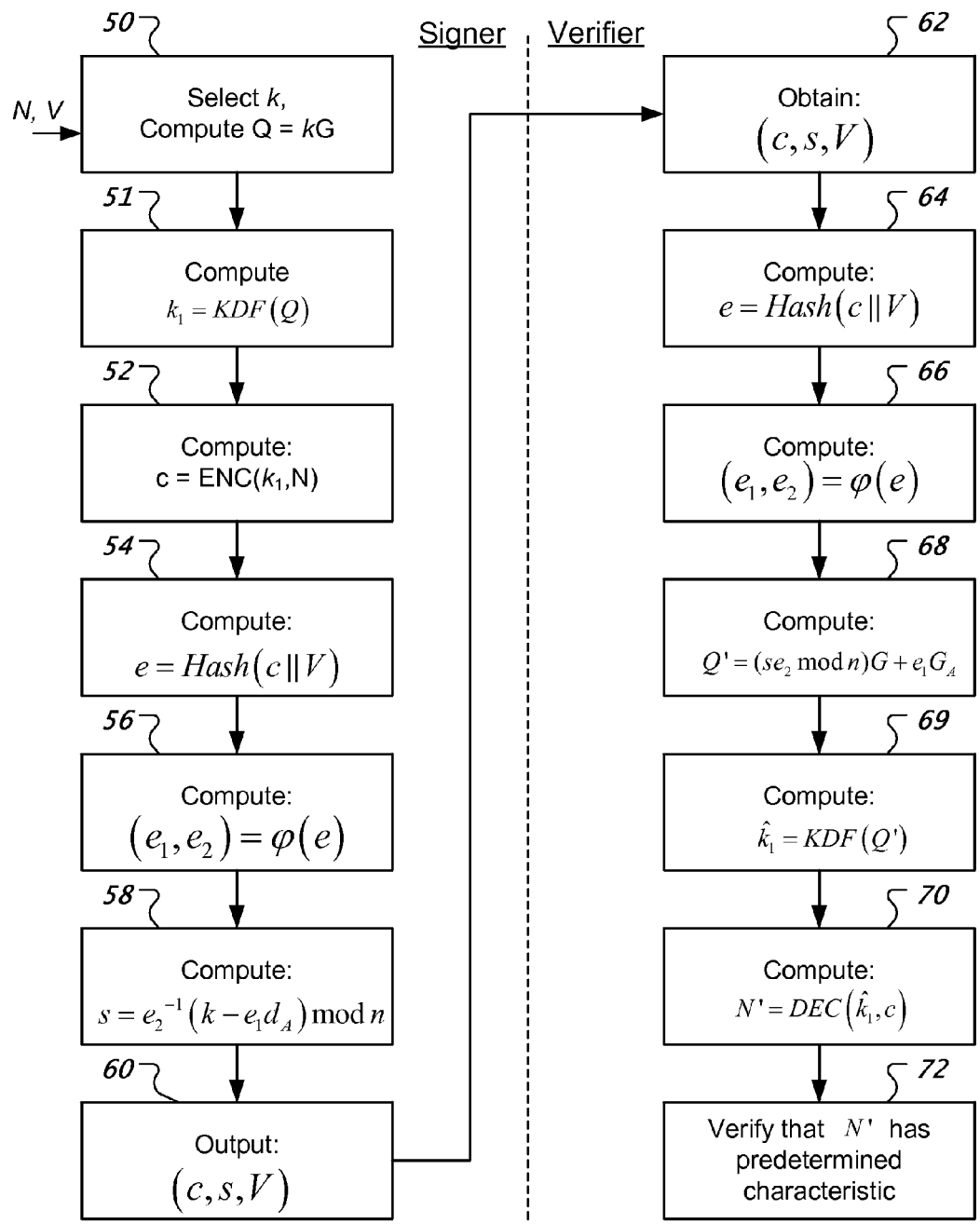
FIG. 18 is a flow chart illustrating computer executable instructions used in generating and verifying a modified Elliptic Curve Pintsov-Vanstone digital signature where at least one of the scalars used in the signature generation is reduced in size to reduce computational expense in performing a multiple point multiplication using the scalar during verification.

FIG. 18 shows a flow chart illustrating computer executable instructions used in generating and verifying a modified Elliptic Curve Pintsov-Vanstone digital signature where at least one of the scalars used in the signature generation is reduced in size to reduce computational expense in performing a multiple point multiplication using the scalar during verification. To participate in the signature scheme, an initial set-up is performed where the signer A (e.g. correspondent 11) generates a long-term private-public key pair that comprises a long-term private key and a long-term public key, the long-term public key being derived from the long-term private key and a base point on an elliptic curve. Determining a long-term private-public key pair may include selecting a random integer $d_A \in [1, n-1]$ and publishing a corresponding public key $G_A$ where $G_A = d_A G$. The parameter $d_A$ is kept private to signer A and may be considered a long-term private key.

Signature generation may then be performed on a message $M \in N$, $V$, e.g. $M = N \| V$, where N is the hidden portion of the message to be signed and V is the visible portion. With respect to FIG. 18, the operations in generating the signature (c, s, V), with the modification noted above, include:

(a) Select a random integer $k \in [1, n-1]$, and compute $Q = kG$ (Block 50)
(b) Compute encryption key $k_1 = KDF(Q)$ (Block 51).
(c) Compute $c = ENC(k_1, N)$ (Block 52).
(d) Compute $e = Hash(c \| V)$ (Block 54).
(e) Compute $(e_1, e_2) = \phi(e)$ (Block 56). If $e_1$ or $e_2 = 0$, go back to step (a).
(f) Compute $s = e_2^{-1}(k - e_1 d_A) \mod n$ (Block 58).
(g) Output signature (c, s, V) (Block 60).

The outputted signature (c, s, V) can be transmitted to a device, which can verify the signature. The device receiving the signature can obtain a long-term public key $G_A$ that is associated with the signer. In some implementations, the device receiving the signature can receive a long-term public key $G_A$ from a key server, use a cached copy of $G_A$, or access a computer storage device that stores $G_A$. With respect to FIG. 18, the operations in verifying the signature (c, s, V), with the modification noted above, include:

(a) Obtain signature (c, s, V) (Block 62).
(b) Compute $e = Hash(c \| V)$ (Block 64).
(c) Compute $(e_1, e_2) = \phi(e)$ (Block 66). If $e_1$ or $e_2 = 0$, reject signature.
(d) Compute $Q' = (se_2 \mod n)G + e_1 G_A$ (Block 68).
(e) Compute $\hat{k}_1 = KDF(Q')$ (Block 69).
(d) Recover N' by decrypting c: $N' = DEC(\hat{k}_1, c)$ (Block 70).
(e) Verify N' has a predetermined characteristic. (Block 72).

Verifying whether N' has a predetermined characteristic can include checking whether N' has sufficient redundancy. In some implementations, verifying whether N' has a predetermined characteristic can include checking whether N' has a previously agreed upon numerical sequence. If any verification fails, the signature should be rejected. Otherwise, the signature may be accepted or "verified" and the message M can be reconstructed, e.g. by concatenating N' and V.

The above signature scheme can be adapted to perform the normal ECPVS scheme by choosing $\phi(e) = (e, 1)$. Choosing $\phi$ such that for all $(e_1, e_2) \in rng \, \phi$, the integers $e_1$ and $e_2$ are significantly smaller than n, gives rise to an accelerated signature verification as described above. Suitable choices for determining a relationship between $e_1$ and $e_2$ may include using one or more of the below mentioned schemes: Scheme A or Scheme B. Other schemes are possible.

Scheme A. Determine $e_1$ and $e_2$ such that $e = e_1/e_2 \mod n$ and $e_1, e_2 \sim \sqrt{N}$. In some implementations, $e_1$ and $e_2$ are determined such that $e = e_1/e_2 \mod n$ and where $e_1$ and $e_2$ each have a bit length approximately half the bit length of n. This can be done deterministically via a half-time application of the Extended Euclidean Algorithm.

As described in Algorithm of the *Guide to Elliptic Curve Cryptography* (D. R. Hankerson, A. J. Menezes, S. A. Vanstone, *Guide to Elliptic Curve Cryptography*, New York: Springer, 2003, pg 40), the Extended Euclidean Algorithm takes positive integers a and b as inputs, wherein $a \leq b$, and outputs a value d which corresponds to the greatest common denominator of a and b along with integers x and y which satisfy the equation $ax + by = d$. The algorithm proceeds as follows:

1. $u \leftarrow a$, $v \leftarrow b$.
2. $x_1 \leftarrow 1$, $y_1 \leftarrow 0$, $x_2 \leftarrow 0$, $y_2 \leftarrow 1$.
3. While $u \neq 0$ do
   $q \leftarrow \lfloor v/u \rfloor$, $r \leftarrow v - qu$, $x \leftarrow x_2 - qx_1$, $y \leftarrow y_2 - qy_1$.
   3.2 $v \leftarrow u$, $u \leftarrow r$, $x_2 \leftarrow x_1$, $x_1 \leftarrow x$, $y_2 \leftarrow y_1$, $y_1 \leftarrow y$.
4. $d \leftarrow v$, $x \leftarrow x_2$, $y \leftarrow y_2$.
5. Return (d, x, y).

In a modified version of the above algorithm, the while statement can be replaced with "while $u \geq \sqrt{n}$ do", where n is the prime order of a cyclic subgroup of an elliptic curve. The modified version of the algorithm can be initialized with $a := e$ and $b := n$ and step 3 repeated until u becomes less than the square root of n. Based on the output of this algorithm, $e_1$ is set to the output d and $e_2$ is set to the output x.

Scheme B. Determine $e_1$ and $e_2$ such that $e = (e_1 \| e_2)$ and such that $e_1$ and $e_2$ each have a bit length approximately half the bit length of n. More generally, $e_1$ and $e_2$ may be chosen as substrings of e each with approximately half the bit length of n.

Figure 19:
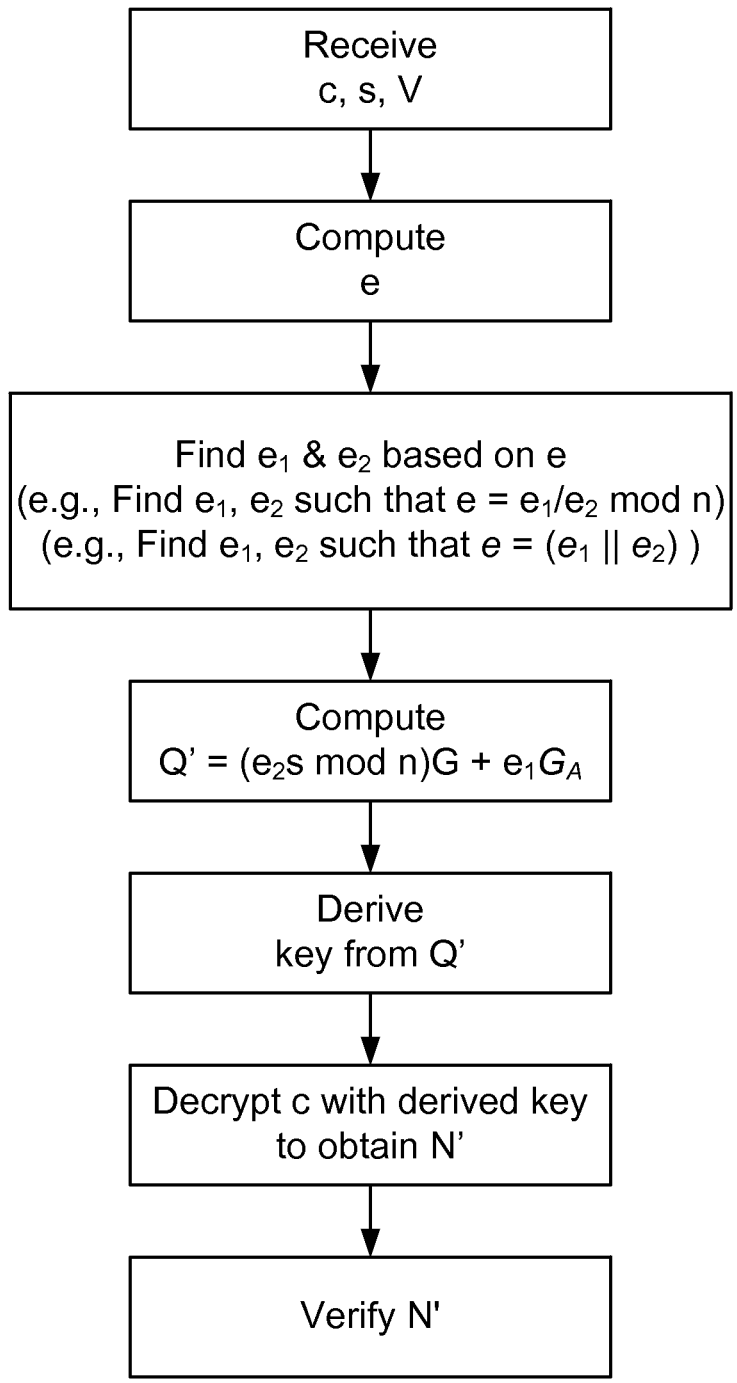
FIG. 19 shows example embodiments of the modified Elliptic Curve Pintsov-Vanstone Signature verification protocol of FIG. 18.

FIG. 19 shows example embodiments of the modified Elliptic Curve Pintsov-Vanstone Signature verification protocol of FIG. 18. A technique based on a modified ECPVS verification protocol of FIG. 18 can include using the above described schemes (e.g., Scheme A or Scheme B) to decrease verification time by utilizing integers with reduced bit lengths. The verifier computes $e = Hash(c \| V)$, where Hash is a hash function. The verifier then finds $e_1$ and $e_2$ based on e. In some implementations, the verifier finds $e_1$ and $e_2$ such that $e = e_1/e_2 \mod n$, where n is the order of the point G. In some implementations, the verifier determines $e_1$ and $e_2$ such that the bit lengths of $e_1$ and $e_2$ are approximately half the bit length of n. In some implementations, the verifier finds $e_1$ and $e_2$ such that $e = e_1 e_2$. The verifier then computes $Q' = (e_2 s \mod n)G + e_1 G_A$, and proceeds as before, thus deriving a key from Q' and then decrypting c with the derived key to obtain a recovered message part N', and then verifying N' based on a predetermined characteristic. Verifying N' can include determining whether N' has a correct form.

It may be noted that speed-ups obtained using the modified ECPV signature scheme described above seem to apply for all curves, including binary Koblitz curves. This is due to the fact that the modified scheme reduces the expected Hamming weight of the scalar multiples involved in the reconstruction of the key Q', which also reducing the number of doubling operations.

With Koblitz curves, it is conceivable to choose the mapping co such that $e_1$ has full-length and low Hamming weight %, with $H(t/n) \approx \frac{1}{2}$. This would allow taking $t/n \approx \frac{1}{9}$, thus decreasing the number of point additions involving $G_A$ by a further factor of 1½ compared to using arbitrary half-size integers $e_1$.

As an example, the process can be modified to $e_1$ and $e_2$ such that $e = e_1 e_2 \mod n$ and $e_1 \sim n^{2/3}$ (e.g., $e_1$ has a bit length approximately ⅔ the bit length of n) and $e_2 \sim n^{1/3}$ (e.g., $e_2$ has a bit length approximately ⅓ the bit length of n). Using the Extended Euclidean Algorithm as discussed above, in this example, a third time application of the algorithm can be used. Assuming one has access to the public signature verification key $G_A$ and to a value $\tilde{G}_A = tG_A$, where $t \sim n^{1/3}$ (e.g. select $t := 2^{m/3}$, where m is the bit length of the elliptic curve). From this, by selecting $e_1 = f_0 + f_1 t$, Q' can be computed as: $Q' = (se_2)G + (f_0 + f_1 t)G_A = (se_2)G + f_0 G_A + f_1 \tilde{G}_A$. As a result, one can apply multiple-point scalar multiplication techniques such as Shamir's Trick, wherein one can force all scalar multiples to be roughly one third of the bit length of the curve in question.

A technique of generating a signature on a message to be sent in an electronic data communication system can be performed by a data processing apparatus configured to perform one or more operations described herein. For example, the technique can include accessing a long-term private key of a long-term private-public key pair; dividing the message into a first message portion and a second message portion; generating an ephemeral key pair that comprises an ephemeral private key and an ephemeral public key, the ephemeral public key being derived from the ephemeral private key and a base point on an elliptic curve; encrypting the first message portion to obtain a first signature component using an encryption key, the encryption key derived from the ephemeral public key; applying a first mathematical function to a combination of the first signature component and the second message portion to obtain an intermediate component e; using the intermediate component e to generate a first value $e_1$ and a second value $e_2$, where a second mathematical function applied to the first value $e_1$ and the second value $e_2$ obtains the intermediate component e; using the first value $e_1$, the second value $e_2$, the long-term private key, and the ephemeral private key to generate a second signature component; and outputting the signature. The signature can include the first signature component, the second signature component, and the second message portion.

A technique of verifying a signature on a message, the signature having been generated by a signer, can be performed by a data processing apparatus configured to perform one or more operations described herein. For example, the technique can include obtaining the signature via an electronic data communication system, the signature being generated based on a long-term private-public key pair and an ephemeral key pair, where the ephemeral key pair comprises an ephemeral private key and an ephemeral public key, the ephemeral public key being derived from the ephemeral private key and a base point on an elliptic curve, where the signature comprises a first signature component which encrypts a first message portion, a second signature component, and a second message portion, and where the message can be reconstructed using the first message portion and the second message portion. The technique can include applying a first mathematical function to a combination of the first signature component and the second message portion to obtain an intermediate component e; using the intermediate component e to generate a first value $e_1$ and a second value $e_2$, where a second mathematical function applied to the first value $e_1$ and the second value $e_2$ obtains the intermediate component e; determining a representation of the ephemeral public key based on the first value $e_1$, the second value $e_2$, the second signature component and a long-term public key of the long-term private-public key pair; using the representation of the ephemeral public key to generate a decryption key; recovering a representation of the first message portion by decrypting the first signature component using the decryption key; and verifying whether the representation of the first message portion satisfies a predetermined characteristic.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, performed by a data processing apparatus, of generating a signature on a message, the method comprising:
   accessing a long-term private key of a long-term private-public key pair;
   dividing the message into a first message portion and a second message portion;
   generating an ephemeral key pair that comprises an ephemeral private key and an ephemeral public key, the ephemeral public key being derived from the ephemeral private key and a base point on an elliptic curve;
   encrypting the first message portion to obtain a first signature component using an encryption key, the encryption key derived from the ephemeral public key;
   applying a first mathematical function to a combination of the first signature component and the second message portion to obtain an intermediate component e;
   using the intermediate component e to generate a first value $e_1$ and a second value $e_2$ such that a second mathematical function applied to the first value $e_1$ and the second value $e_2$ obtains the intermediate component e;
   using the first value $e_1$, the second value $e_2$, the long-term private key, and the ephemeral private key to generate a second signature component; and
   outputting the signature, wherein the signature comprises the first signature component, the second signature component, and the second message portion.

2. The method according to claim 1, wherein the first value $e_1$ and the second value $e_2$ are generated such that $e=e_1/e_2 \mod n$, wherein n is the order of the group generated by the base point on the elliptic curve.

3. The method according to claim 2, wherein $e_1$ and $e_2$ are integers that have a bit length of approximately half the bit length of n.

4. The method according to claim 1, wherein the first value $e_1$ and the second value $e_2$ are generated such that $e=e_1 \| e_2$.

5. The method according to claim 4, wherein $e_1$ and $e_2$ each have a bit length approximately half the bit length of n, where n is the order of the group generated by the base point on the elliptic curve.

6. The method according to claim 1, wherein the second signature component is generated as $s=e_2^{-1}(k-e_1 d_A) \mod n$, where s is the second signature component, n is the order of the group generated by the base point on the elliptic curve, k is the ephemeral private key, and $d_A$ is the long-term private key.

7. The method according to claim 1, wherein the signature comprises the second signature component and a combination of the first signature component and the second message portion.

8. A method, performed by a data processing apparatus, of verifying a signature on a message, the method comprising:
obtaining the signature via an electronic data communication system, the signature having been generated based on a long-term private-public key pair and an ephemeral key pair, wherein the ephemeral key pair comprises an ephemeral private key and an ephemeral public key, the ephemeral public key having been derived from the ephemeral private key and a base point on an elliptic curve, wherein the signature comprises a first signature component which encrypts a first message portion, a second signature component, and a second message portion, and wherein the message can be reconstructed using the first message portion and the second message portion;
applying a first mathematical function to a combination of the first signature component and the second message portion to obtain an intermediate component e;
using the intermediate component e to generate a first value $e_1$ and a second value $e_2$ such that a second mathematical function applied to the first value $e_1$ and the second value $e_2$ obtains the intermediate component e;
determining the ephemeral public key based on the first value $e_1$, the second value $e_2$, the second signature component, the base point of the elliptic curve, and a long-term public key of the long-term private-public key pair;
using the ephemeral public key to generate a decryption key;
recovering a representation of the first message portion by decrypting the first signature component using the decryption key;
verifying whether the representation of the first message portion satisfies a predetermined characteristic; and
accepting the signature upon verification.

9. The method according to claim 8, wherein the first value $e_1$ and the second value $e_2$ are generated such that $e=e_1/e_2 \mod n$, wherein n is the order of the group generated by the base point on the elliptic curve.

10. The method according to claim 9, wherein $e_1$ and $e_2$ are integers that have a bit length of approximately half the bit length of n.

11. The method according to claim 8, wherein the first value $e_1$ and the second value $e_2$ are generated such that $e=e_1 \| e_2$.

12. The method according to claim 11, wherein $e_1$ and $e_2$ each have a bit length approximately half the bit length of n, where n is the order of the group generated by the base point on the elliptic curve.

13. The method according to claim 8, wherein the ephemeral public key is generated as $Q'=(se_2 \mod n)G+e_1 G_A$, where $Q'$ is the ephemeral public key, s is the second signature component, G is the base point of the elliptic curve, n is the order of the group generated by the base point on the elliptic curve, and $G_A$ is the long-term public key.

14. The method according to claim 8, wherein the signature comprises the second signature component and the combination of the first signature component and the second message portion.

15. An apparatus comprising:
circuitry to store data, the data comprising a message; and
processor electronics configured to
access a long-term private key of a long-term private-public key pair,
divide the message into a first message portion and a second message portion,
generate an ephemeral key pair that comprises an ephemeral private key and an ephemeral public key, the ephemeral public key being derived from the ephemeral private key and a base point on an elliptic curve,
encrypt the first message portion to obtain a first signature component using an encryption key, the encryption key derived from the ephemeral public key,
apply a first mathematical function to a combination of the first signature component and the second message portion to obtain an intermediate component e,
use the intermediate component e to generate a first value $e_1$ and a second value $e_2$, wherein a second mathematical function applied to the first value $e_1$ and the second value $e_2$ obtains the intermediate component e,
use the first value $e_1$, the second value $e_2$ such that the long-term private key, and the ephemeral private key to generate a second signature component, and
output a signature associated with the message, wherein the signature comprises the first signature component, the second signature component, and the second message portion.

16. The apparatus according to claim 15, wherein the first value $e_1$ and the second value $e_2$ are generated such that $e=e_1/e_2 \mod n$, wherein n is the order of the group generated by the base point on the elliptic curve.

17. The apparatus according to claim 16, wherein $e_1$ and $e_2$ are integers that have a bit length of approximately half the bit length of n.

18. The apparatus according to claim 15, wherein the first value $e_1$ and the second value $e_2$ are generated such that $e=e_1 \| e_2$.

19. The apparatus according to claim 18, wherein $e_1$ and $e_2$ both have a bit length approximately half the bit length of n, where n is the order of the group generated by the base point on the elliptic curve.

20. The apparatus according to claim 15, wherein the second signature component is generated as $s=e_2^{-1}(k-e_1 d_A) \mod n$, where s is the second signature component, n is an order of a group generated by the base point on the elliptic curve, k is the ephemeral private key, and $d_A$ is the long-term private key.

21. The apparatus according to claim 15, wherein the signature comprises the second signature component and a combination of the first signature component and the second message portion.

22. An apparatus comprising:
circuitry configured to receive data, the data comprising a signature associated with a message, the signature having been generated based on a long-term private-public key pair and an ephemeral key pair, wherein the ephemeral key pair comprises an ephemeral private key and an ephemeral public key, the ephemeral public key being derived from the ephemeral private key and a base point on an elliptic curve, wherein the signature comprises a first signature component which encrypts a first message portion, a second signature component, and a second message portion, and wherein the message can be reconstructed using the first message portion and the second message portion; and processor electronics configured to
apply a first mathematical function to a combination of the first signature component and the second message portion to obtain an intermediate component e;
use the intermediate component e to generate a first value $e_1$ and a second value $e_2$ such that a second mathematical function applied to the first value $e_1$ and the second value $e_2$ obtains the intermediate component e;
determine the ephemeral public key based on the first value $e_1$, the second value $e_2$, the second signature component, the base point of the elliptic curve, and a long-term public key of the long-term private-public key pair;
use the ephemeral public key to generate a decryption key;
recover a representation of the first message portion by decrypting the first signature component using the decryption key; and
verify whether the representation of the first message portion satisfies a predetermined characteristic.

23. The apparatus according to claim 22, wherein the first value $e_1$ and the second value $e_2$ are generated such that $e = e_1/e_2 \mod n$, wherein n is the order of the group generated by the base point on the elliptic curve.

24. The apparatus according to claim 23, wherein $e_1$ and $e_2$ are integers that have a bith length of approximately half the bit length of n.

25. The apparatus according to claim 22, wherein the first value $e_1$ and the second value $e_2$ are generated such that $e = e_1 \| e_2$.

26. The apparatus according to claim 25, wherein $e_1$ and $e_2$ each have a bit length of approximately half the bit length of n, where n is the order of the group generated by the base point on the elliptic curve.

27. The apparatus according to claim 22, wherein the representation of the ephemeral public key is generated as $Q' = (se_2 \mod n)G + e_1 G_A$, where Q' is the ephemeral public key, s is the second signature component, G is the base point of the elliptic curve, n is the order of the group generated by the base point on the elliptic curve, and $G_A$ is the long-term public key.

28. The apparatus according to claim 22, wherein the signature comprises the second signature component and the combination of the first signature component and the second message portion.

29. A computer storage medium encoded with a computer program for generating a signature on a message, the program comprising instructions that when executed by data processing apparatus cause the data processing apparatus to perform operations comprising:
accessing a long-term private key of a long-term private-public key pair;
dividing the message into a first message portion and a second message portion;
generating an ephemeral key pair that comprises an ephemeral private key and an ephemeral public key, the ephemeral public key being derived from the ephemeral private key and a base point on an elliptic curve;
encrypting the first message portion to obtain a first signature component using an encryption key, the encryption key derived from the ephemeral public key;
applying a first mathematical function to a combination of the first signature component and the second message portion to obtain an intermediate component e;
using the intermediate component e to generate a first value $e_1$ and a second value $e_2$ such that a second mathematical function applied to the first value $e_1$ and the second value $e_2$ obtains the intermediate component e;
using the first value $e_1$, the second value $e_2$, the long-term private key, and the ephemeral private key to generate a second signature component; and
outputting the signature, wherein the signature comprises the first signature component, the second signature component, and the second message portion.

30. A computer storage medium encoded with a computer program for verifying a signature on a message, the program comprising instructions that when executed by data processing apparatus cause the data processing apparatus to perform operations comprising:
obtaining the signature, the signature having been generated based on a long-term private-public key pair and an ephemeral key pair, wherein the ephemeral key pair comprises an ephemeral private key and an ephemeral public key, the ephemeral public key being derived from the ephemeral private key and a base point on an elliptic curve, wherein the signature comprises a first signature component which encrypts a first message portion, a second signature component, and a second message portion, and wherein the message can be reconstructed using the first message portion and the second message portion;
applying a first mathematical function to a combination of the first signature component and the second message portion to obtain an intermediate component e;
using the intermediate component e to generate a first value $e_1$ and a second value $e_2$ such that a second mathematical function applied to the first value $e_1$ and the second value $e_2$ obtains the intermediate component e;
determining the ephemeral public key based on the first value $e_1$, the second value $e_2$, the second signature component, the base point of the elliptic curve, and a long-term public key of the long-term private-public key pair;
using the ephemeral public key to generate a decryption key;
recovering a representation of the first message portion by decrypting the first signature component using the decryption key; and
verifying whether the representation of the first message portion satisfies a predetermined characteristic.

* * * * *

UNITED STATES PATENT AND TRADEMARK OFFICE
CERTIFICATE OF CORRECTION

PATENT NO. : 8,467,535 B2  
APPLICATION NO. : 13/041759  
DATED : June 18, 2013  
INVENTOR(S) : Marinus Struik Page 1 of 1

It is certified that error appears in the above-identified patent and that said Letters Patent is hereby corrected as shown below:

On Title Page 2, In Column 2 (Other Publications), In Line 67, delete "Certricom" and insert -- Certicom --, therefor.

On Title Page 3, In Column 1 (Other Publications), In Line 47, delete "Internaitonal" and insert -- International --, therefor.

On Title Page 3, In Column 1 (Other Publications), In Line 51, delete "Internaitonal" and insert -- International --, therefor.

On Title Page 3, In Column 2 (Other Publications), In Line 11, delete "Anormalous" and insert -- Anomalous --, therefor.

In the Claims:

In Column 33, In Line 42, In Claim 24, delete "bith" and insert -- bit --, therefor.

Signed and Sealed this  
Third Day of September, 2013

Teresa Stanek Rea  
*Acting Director of the United States Patent and Trademark Office*